United States Patent
Iwase et al.

(10) Patent No.: US 8,622,182 B2
(45) Date of Patent: *Jan. 7, 2014

(54) VEHICLE DRIVE DEVICE

(75) Inventors: Mikio Iwase, Anjo (JP); Tomohide Suzuki, Kariya (JP); Naoya Jinnai, Anjo (JP); Tatsuya Okishima, Chiryni (JP); Toshihiko Kamiya, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 323 days.

This patent is subject to a terminal disclaimer.

(21) Appl. No.: 12/926,446

(22) Filed: Nov. 18, 2010

(65) Prior Publication Data

US 2011/0240430 A1 Oct. 6, 2011

(30) Foreign Application Priority Data

Nov. 19, 2009 (JP) ................................ 2009-264381
Mar. 5, 2010 (JP) ................................ 2010-049192
Mar. 5, 2010 (JP) ................................ 2010-049193
Nov. 2, 2010 (JP) ................................ 2010-246512

(51) Int. Cl.
 *B60K 6/387* (2007.10)
 *F16D 47/06* (2006.01)
 *F16D 25/0638* (2006.01)
 *H02K 7/108* (2006.01)

(52) U.S. Cl.
 USPC .......... 192/3.33; 180/65.26; 903/914; 310/78

(58) Field of Classification Search
 USPC ....................................... 192/3.33
 See application file for complete search history.

(56) References Cited

U.S. PATENT DOCUMENTS

| 3,308,686 A | 3/1967 | Magg et al. |
| 4,466,502 A | 8/1984 | Sakai |
| 6,092,985 A | 7/2000 | Winkam |

(Continued)

FOREIGN PATENT DOCUMENTS

| DE | 10 2004 033 141 A1 | 2/2006 |
| DE | 10 2009 022 272 A1 | 12/2009 |

(Continued)

OTHER PUBLICATIONS

Feb. 8, 2011 International Search Report issued in Patent Application No. PCT/JP2010/070714 (with English-language translation).

(Continued)

*Primary Examiner* — Richard M. Lorence
(74) *Attorney, Agent, or Firm* — Oliff and Berridge, PLC

(57) ABSTRACT

A drive device for a vehicle configured between an internal combustion engine and a wheel. The drive device includes a rotary electric machine, and an engagement device connecting the drive device to the engine by a fluid coupling using hydraulic pressure. A case houses at least a portion of the drive device and includes a support wall extending radially, and a cylindrical projecting portion projecting from the support wall toward a side in an axial second direction that is in a direction opposite to the axial first direction. The engagement device includes an operating oil pressure chamber supplied with the hydraulic pressure. A rotor member of the rotary electric machine is radially supported by the cylindrical projecting portion in a rotatable state via a support bearing. The cylindrical projecting portion is formed with an operating oil supply passage supplying oil to the operating oil pressure chamber.

13 Claims, 6 Drawing Sheets

(56) References Cited

U.S. PATENT DOCUMENTS

| | | | |
|---|---|---|---|
| 6,258,001 | B1 | 7/2001 | Wakuta et al. |
| 6,340,339 | B1 * | 1/2002 | Tabata et al. ............... 475/5 |
| 6,341,584 | B1 | 1/2002 | Itoyama et al. |
| 6,492,742 | B1 | 12/2002 | Fujikawa et al. |
| 6,533,692 | B1 | 3/2003 | Bowen |
| 6,863,140 | B2 | 3/2005 | Noreikat et al. |
| 7,114,484 | B2 | 10/2006 | Kaita et al. |
| 7,114,604 | B2 * | 10/2006 | Masuya ............... 192/3.29 |
| 7,810,592 | B2 * | 10/2010 | Klemen et al. ........... 180/65.225 |
| 7,954,578 | B2 | 6/2011 | Kim et al. |
| 8,155,848 | B2 | 4/2012 | Kobayashi et al. |
| 2002/0043883 | A1 | 4/2002 | Shimizu |
| 2003/0127262 | A1 | 7/2003 | Noreikat et al. |
| 2005/0066933 | A1 | 3/2005 | Kaita et al. |
| 2005/0079942 | A1 | 4/2005 | Bauknecht et al. |
| 2006/0289209 | A1 | 12/2006 | Grosspietsch et al. |
| 2007/0108857 | A1 | 5/2007 | Nomura et al. |
| 2007/0175726 | A1 | 8/2007 | Combes et al. |
| 2009/0054203 | A1 | 2/2009 | Heeke |
| 2009/0100965 | A1 | 4/2009 | Sanji et al. |
| 2009/0271079 | A1 | 10/2009 | Kobayashi et al. |
| 2009/0283344 | A1 | 11/2009 | Arnold et al. |
| 2010/0038201 | A1 * | 2/2010 | Mueller et al. ............... 192/3.29 |
| 2010/0062899 | A1 | 3/2010 | Engelmann et al. |
| 2010/0105518 | A1 * | 4/2010 | Kasuya et al. ............... 477/5 |
| 2011/0118079 | A1 | 5/2011 | Mueller et al. |
| 2011/0121692 | A1 | 5/2011 | Iwase et al. |
| 2011/0240430 | A1 | 10/2011 | Iwase et al. |
| 2011/0240431 | A1 * | 10/2011 | Iwase et al. ............... 192/3.29 |
| 2012/0217830 | A1 | 8/2012 | Iwase et al. |
| 2012/0318630 | A1 | 12/2012 | Iwase et al. |
| 2012/0319514 | A1 | 12/2012 | Iwase et al. |

FOREIGN PATENT DOCUMENTS

| | | |
|---|---|---|
| FR | 2 830 589 | 4/2003 |
| JP | U-3-69748 | 7/1991 |
| JP | B2-3-72507 | 11/1991 |
| JP | A-7-217724 | 8/1995 |
| JP | A-8-277859 | 10/1996 |
| JP | B2-3080612 | 6/2000 |
| JP | A-2002-220078 | 8/2002 |
| JP | A-2005-212494 | 8/2005 |
| JP | A-2006-137406 | 6/2006 |
| JP | A-2007-015810 | 1/2007 |
| JP | A-2007-071083 | 3/2007 |
| JP | A-2007-118717 | 5/2007 |
| JP | A-2009-001127 | 1/2009 |
| JP | A-2009-1165 | 1/2009 |
| JP | A-2009-011010 | 1/2009 |
| JP | A-2009-101730 | 5/2009 |
| JP | A-2009-262659 | 11/2009 |
| WO | WO 2008/092426 A2 | 8/2008 |
| WO | WO 2010/017786 A1 | 2/2010 |

OTHER PUBLICATIONS

Feb. 8, 2011 International Search Report issued in Patent Application No. PCT/JP2010/070715 (with English-language translation).
Feb. 8, 2011 International Search Report issued in Patent Application No. PCT/JP2010/070717 (with English-language translation).
May 6, 2011 International Search Report issued in Patent Application No. PCT/JP2011/053886.
May 11, 2011 International Search Report issued in Patent Application No. PCT/JP2011/053887.
May 31, 2011 International Search Report issued in Patent Application No. PCT/JP2011/055721.
Jul. 8, 2011 International Search Report issued in Patent Application No. PCT/JP2011/055720.
Feb. 8, 2011 International Search Report issued in PCT/JP2010/070716 (with translation).
Dec. 26, 2012 Office Action issued in U.S. Appl. No. 13/522,135.
Mar. 18, 2013 Office Action issued in U.S. Appl. No. 12/926,447.
Mar. 28, 2013 Office Action issued in Japanese Patent Application No. 2010-049193 (English Translation only).
U.S. Appl. No. 12/948,297, filed Nov. 17, 2010.
U.S. Appl. No. 13/522,597, filed Jul. 17, 2012.
U.S. Appl. No. 13/522,426, filed Jul. 16, 2012.
U.S. Appl. No. 12/926,447, filed Nov. 18, 2010.
U.S. Appl. No. 13/502,909, filed Apr. 19, 2012.
U.S. Appl. No. 13/522,135, filed Jul. 13, 2012.
U.S. Appl. No. 13/522,651, filed Jul. 17, 2012.
Jun. 27, 2013 Partial Translation of Notification of Reasons for Refusal issued in Japanese Application No. 2010-246511 (English Partial Translation Only).
Aug. 2, 2013 Office Action issued in U.S. Appl. No. 13/522,597 issued in the name of Suyama.
Nov. 7, 2013 Japanese Office Action issued in Japanese Patent Application No. 2010-246515 (with translation).

\* cited by examiner

US 8,622,182 B2

VEHICLE DRIVE DEVICE

INCORPORATION BY REFERENCE

The disclosure of Japanese Patent Applications No. 2010-246512 filed on Nov. 2, 2010, No. 2009-264381 filed on Nov. 19, 2009, No. 2010-049192 filed on Mar. 5, 2010, and No. 2010-049193 filed on Mar. 5, 2010, including the specification, drawings and abstract is incorporated herein by reference in its entirety.

BACKGROUND OF THE INVENTION

The present invention relates to a drive device for a vehicle equipped with an input member drivingly connected to an internal combustion engine, an output member drivingly connected to a wheel, a rotary electric machine, a fluid coupling drivingly connected to the rotary electric machine, an engagement device selectively drivingly connecting the input member with the rotary electric machine and the fluid coupling, and a case housing at least the rotary electric machine, the engagement device, and the fluid coupling.

DESCRIPTION OF THE RELATED ART

As a drive device for a vehicle such as those described above, for example, a device disclosed in Japanese Patent Application Publication No. JP-A-2006-137406 described below has already been known. As shown in FIG. 1 and so on of Japanese Patent Application Publication No. JP-A-2006-137406, in the drive device for a vehicle, a rotary electric machine (motor in Japanese Patent Application Publication No. JP-A-2006-137406; hereinafter the same reference applies), a fluid coupling (torque converter 1), and an engagement device (clutch mechanism 16) selectively drivingly establishing a connection therebetween are arranged in a case (motor housing 6) housing these devices. In this device, oil for operation is supplied to an operating oil pressure chamber of the engagement device from an oil passage formed in a support wall (engine-side sidewall portion) of an internal combustion engine (engine). Furthermore, a rotor member (a rotor 12 and a support member thereof) of the rotary electric machine is radially supported in a rotatable state by a case wall different from the support wall on the side axially opposite to the internal combustion engine with respect to the engagement device.

In this way, in the device of Japanese Patent Application Publication No. JP-A-2006-137406, the two wall portions different from each other are required on both axial sides relative to the engagement device in order to respectively achieve appropriate supply of hydraulic pressure to the operating oil pressure chamber of the engagement device and appropriate rotational support of the rotor member appropriately. As a result, there has been a problem that an axial length increases by that amount, inevitably resulting in an increase in the size of the entire device.

SUMMARY OF THE INVENTION

Therefore, it is desired to realize a drive device for a vehicle that can appropriately supply oil to an operating oil pressure chamber of an engagement device and can rotatably support a rotor member of a rotary electric machine appropriately, and that can be downsized as a whole by further reducing an axial length of the device.

A drive device for a vehicle according to a first aspect of the present invention includes an input member drivingly connected to an internal combustion engine, an output member drivingly connected to a wheel, a rotary electric machine, a fluid coupling drivingly connected to the rotary electric machine, an engagement device selectively drivingly connecting the input member with the rotary electric machine and the fluid coupling by hydraulic pressure, and a case housing at least the rotary electric machine, the engagement device, and the fluid coupling. A structure of the drive device for a vehicle has a characteristic structure in which the case includes a support wall extending at least radially on a side in an axial first direction that is axially on the internal combustion engine side relative to the engagement device, and also includes a cylindrical projecting portion projecting from the support wall toward a side in an axial second direction that is in a direction opposite to the axial first direction, the engagement device includes an operating oil pressure chamber supplied with the hydraulic pressure, a rotor member of the rotary electric machine is radially supported by the cylindrical projecting portion in a rotatable state via a support bearing, and the cylindrical projecting portion is formed with an operating oil supply passage supplying oil to the operating oil pressure chamber.

Note that the term "drivingly connected" refers to a state in which two rotational elements are connected so as to be capable of transmitting a driving force, and is used as a concept including a state in which the two rotational elements are connected so as to rotate as a unit with each other, or a state in which the two rotational elements are connected so as to be capable of transmitting the driving force via one or two or more transmitting members. Such transmitting members include various members that transmit rotation at the same speed or at a changed speed, such as shafts, gear mechanisms, belts, and chains. Such transmitting members may also include engagement devices that selectively transmit the rotation and the driving force, such as friction clutches and dog clutches.

The term "rotary electric machine" is used as a concept including all of a motor (electric motor), a generator (electric generator), and a motor-generator that serves as a motor or a generator depending on the necessity.

Moreover, the term "fluid coupling" is used as a concept including both of a torque converter having a torque amplifying function and an ordinary fluid coupling having no torque amplifying function.

According to the first aspect as described above, the rotor member of the rotary electric machine can be radially supported on the cylindrical projecting portion of the case so as to be rotatable via the support bearing. Furthermore, oil can be supplied to the operating oil pressure chamber of the engagement device via the operating oil supply passage formed in the cylindrical projecting portion radially supporting the rotor member. In this way, because the cylindrical projecting portion provided as a unit with the support wall can achieve appropriate supply of hydraulic pressure to the operating oil pressure chamber of the engagement device and appropriate rotational support of the rotor member, an axial length of the entire device can be reduced.

Therefore, the drive device for a vehicle can be achieved that can appropriately supply oil to the operating oil pressure chamber and can rotatably support the rotor member appropriately, and that can be downsized as a whole by further reducing the axial length.

The drive device for a vehicle according to a second aspect of the present invention may be structured such that the engagement device further includes an engagement input side member connected to the input member and an engagement output side member that is paired with the engagement input side member and is connected to the fluid coupling, and the engagement output side member and the rotor member are connected so as to rotate as a unit with each other.

According to the second aspect, the engagement output side member connected so as to rotate as a unit with the rotor member can be radially supported on the cylindrical projecting portion via the rotor member and the support bearing appropriately.

The drive device for a vehicle according to a third aspect of the present invention may be structured such that the case includes, separately from a first support wall serving as the support wall, a second support wall extending at least radially on the side in the axial second direction relative to the fluid coupling, the fluid coupling includes a coupling input side member and a coupling output side member paired with the coupling input side member, the engagement output side member and the coupling input side member are connected so as to rotate as a unit with each other, and the coupling input side member is radially supported by the second support wall in a rotatable state via a second support bearing provided separately from a first support bearing serving as the support bearing.

According to the third aspect, the first support wall and the second support wall located on both axial sides relative to the rotary electric machine, the engagement device, and the fluid coupling can radially support, over an axially long supporting span, the rotor member, the engagement output side member, and the coupling input side member that are connected so as to rotate as a unit with each other. As a result, the whole of the rotor member, the engagement output side member, and the coupling input side member can be supported with a high degree of accuracy of center axis.

The drive device for a vehicle according to a fourth aspect of the present invention may be structured to further include an intermediate output member drivingly connected to the fluid coupling and also drivingly connected to the output member, and structured such that the fluid coupling includes a body portion housing chamber housing a body portion of the fluid coupling, and the intermediate output member is formed with a coupling supply oil passage supplying oil to the body portion housing chamber.

According to the fourth aspect, the oil supplied to the operating oil pressure chamber of the engagement device is supplied via the operating oil supply passage formed in the cylindrical projecting portion, and the oil supplied to the body portion housing chamber of the fluid coupling is supplied via the coupling supply oil passage formed in the intermediate output member. Accordingly, when compared with a case in which both the operating oil supply passage and the coupling supply oil passage are formed in the intermediate output member, the intermediate output member can be downsized. Consequently, the entire device can be downsized by reducing the radial dimension thereof while supplying the oil respectively to the operating oil pressure chamber of the engagement device and the body portion housing chamber of the fluid coupling appropriately.

The drive device for a vehicle according to a fifth aspect of the present invention may be structured such that the engagement device further includes an engagement member and a pressing member pressing the engagement member, and the engagement output side member includes an opposed cylindrical portion that is formed in a cylindrical shape so as to cover at least the radially outside of the engagement member and is arranged so as to be radially opposed to the cylindrical projecting portion on the radially inside of the engagement member, at least a part of the operating oil pressure chamber is defined by the pressing member slidably arranged relative to the opposed cylindrical portion and by the opposed cylindrical portion, and the opposed cylindrical portion is formed with an oil hole communicating between the operating oil supply passage and the operating oil pressure chamber.

According to the fifth aspect, the engagement output side member can further be radially supported on the cylindrical projecting portion via the opposed cylindrical portion. The engagement output side member can be thus rotatably supported in a more reliable manner. Furthermore, in this structure, in the case of defining at least a part of the operating oil pressure chamber with the opposed cylindrical portion of the engagement output side member and the pressing member, the oil can be appropriately supplied from the operating oil supply passage to the operating oil pressure chamber via the oil hole formed in the opposed cylindrical portion.

The drive device for a vehicle according to a sixth aspect of the present invention may be structured such that the opposed cylindrical portion is arranged on the radially outside of the cylindrical projecting portion, and the support bearing is radially supported on an outer circumferential face of the cylindrical projecting portion and is arranged between the support wall and the opposed cylindrical portion in the axial direction.

According to the sixth aspect, the whole of the rotor member and the engagement output side member can be arranged in a compact manner by arranging axially side by side the support bearing and the opposed cylindrical portion on the radially outside of the cylindrical projecting portion.

The drive device for a vehicle according to a seventh aspect of the present invention may be structured such that the rotor member includes a rotor body and a rotor support member extending radially inward from the rotor body so as to support the rotor body, the coupling input side member includes a cover portion housing the body portion of the fluid coupling, and a pump drive shaft that is provided to the radially inside of the second support wall and drivingly connected to an oil pump, the rotor support member, the engagement output side member, and the cover portion are connected so as to rotate as a unit with each other, and the rotor support member is radially supported by the cylindrical projecting portion via the support bearing, and the pump drive shaft is radially supported by the second support wall via the second support bearing.

According to the seventh aspect, a structure can be appropriately achieved in which the rotor member, the engagement output side member, and the coupling input side member are connected so as to rotate as a unit with each other, and the whole of these members is radially supported over an axially long supporting span. Furthermore, hydraulic pressure required in various parts in the device can be generated by driving the oil pump via the pump drive shaft of the coupling input side member.

The drive device for a vehicle according to an eighth aspect of the present invention may be structured such that the input member is arranged so as to penetrate through the radially inside of the cylindrical projecting portion, and the input member and the engagement input side member are connected so as to rotate as a unit with each other to structure an input transmission member, and such that a first seal member is arranged between the rotor support member and the cylindrical projecting portion on the side in the axial first direction relative to the engagement device, and a second seal member is arranged between the cylindrical projecting portion and the input transmission member.

According to the eighth aspect, power of the internal combustion engine can be transmitted to the engagement input side member of the engagement device via the input member arranged so as to penetrate through the radially inside of the cylindrical projecting portion. Furthermore, even if the oil supplied from the operating oil supply passage to the operating oil pressure chamber leaks out in the vicinity of the cylindrical projecting portion, the oil can be confined within the vicinity of the cylindrical projecting portion by the first seal member and the second seal member, thereby suppressing outflow of the oil to the internal combustion engine side or the rotary electric machine side.

The drive device for a vehicle according to a ninth aspect of the present invention may be structured such that the engagement output side member includes an opposed cylindrical portion that is formed in a cylindrical shape so as to cover at least the radially outside of the engagement member provided in the engagement device and is arranged so as to be radially opposed to the cylindrical projecting portion on the radially inside of the engagement member, and the support bearing is arranged between the first seal member and the opposed cylindrical portion in the axial direction.

According to the ninth aspect, while lubricating the support bearing by using the oil leaking out from between the cylindrical projecting portion and the opposed cylindrical portion when supplied from the operating oil supply passage to the operating oil pressure chamber, outflow of the oil to the rotary electric machine side can be suppressed.

The drive device for a vehicle according to a tenth aspect, the present invention may be structured such that a junction between the rotor support member and the engagement output side member is formed with a fastening portion where both of the members are fastened with each other by a bolt, and a radially fitting portion where both of the members radially contact each other and fit against each other, and a third seal member is further arranged between the rotor support member and the engagement output side member at the radially fitting portion.

According to the tenth aspect, the rotor support member and the engagement output side member can be appropriately mutually positioned in the radial direction by using the radially fitting portion. Furthermore, the rotor support member and the engagement output side member can be appropriately fastened with each other through the fastening portion. Consequently, the rotor support member and the engagement output side member can be structured as an integral rotational member that is tightly connected to be fixed without looseness with a high degree of accuracy of center axis, thereby maintaining a high degree of accuracy of center axis of the engagement device. Moreover, even if the oil supplied from the operating oil supply passage to the operating oil pressure chamber leaks out in the vicinity of the cylindrical projecting portion, the oil can be confined within the vicinity of the cylindrical projecting portion by the third seal member arranged at the radially fitting portion, thereby suppressing outflow of the oil to the rotary electric machine side.

The drive device for a vehicle according to an eleventh aspect of the present invention may be structured such that the engagement device further includes an engagement member and a pressing member pressing the engagement member, the engagement output side member includes an axially extending portion axially extending so as to cover at least the radially outside of the engagement member, and a radially extending portion that is provided as a unit with the axially extending portion and extends radially inward from an end portion on the side in the axial first direction of the axially extending portion, the operating oil pressure chamber is formed between the radially extending portion and the pressing member, and the rotor support member is connected to the radially extending portion, and an open end portion on the side in the axial second direction of the axially extending portion is connected to the cover portion.

According to the eleventh aspect, by using the radially extending portion that is a radially extending portion of the engagement output side member, the operating oil pressure chamber can be appropriately formed between the radially extending portion and the pressing member, and the engagement output side member can be appropriately connected with the rotor support member. Furthermore, by using the open end portion on the side in the axial second direction of the axially extending portion that is an axially extending portion of the engagement output side member, the engagement output side member can be appropriately connected with the cover portion. As a result, the whole of the rotor member, the engagement output side member, and the coupling input side member can be connected into a compact assembly.

The drive device for a vehicle according to a twelfth aspect of the present invention may be structured such that the input member is arranged so as to penetrate through the radially inside of the cylindrical projecting portion and is radially supported on an inner circumferential face of the cylindrical projecting portion in a rotatable state via a third support bearing provided separately from a first support bearing serving as the support bearing.

According to the twelfth aspect, the rotor member connected to the engagement output side member and the input member connected to the engagement input side member are radially supported in a rotatable state on the outer circumferential face and the inner circumferential face of the cylindrical projecting portion, on the same side in the axial first direction relative to the rotary electric machine. Therefore, the engagement input side member and the engagement output side member serving as members on both input and output sides of the engagement device can be radially supported within a relatively narrow axial span appropriately. Consequently, a high degree of accuracy of center axis of the engagement device can be maintained, and the entire device can be downsized by reducing the axial length.

The drive device for a vehicle according to a thirteenth aspect of the present invention may be structured such that the cylindrical projecting portion is formed with a circulating oil supply passage that supplies oil to an engagement member housing chamber housing the engagement member provided in the engagement device.

According to the thirteenth aspect, oil can be supplied to the engagement member housing chamber via the circulating oil supply passage formed in the cylindrical projecting portion, thereby efficiently cooling the engagement member by the oil thus supplied. Also in this structure, when compared with a case in which the operating oil supply passage and the circulating oil supply passage are formed, for example, inside the input member, an oil passage structure can be simplified, whereby manufacturability of the drive device for a vehicle can be improved.

DETAILED DESCRIPTION OF THE EMBODIMENT

Figure 1:
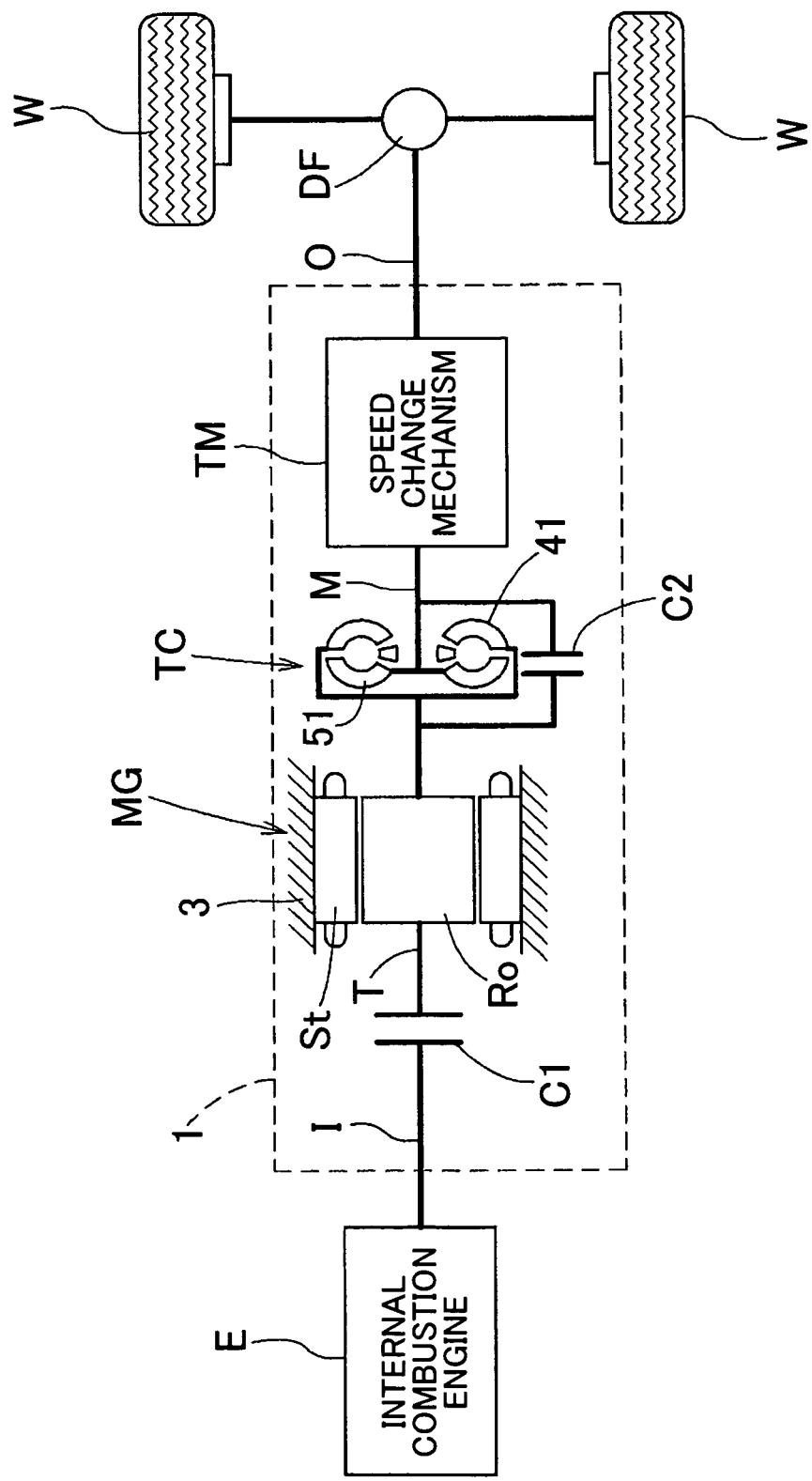
FIG. 1 is a schematic diagram showing an outline structure of a drive device according to an embodiment of the present invention.

An embodiment of the present invention will be described with reference to the accompanying drawings. As shown in FIG. 1, the drive device 1 is a drive device for a hybrid vehicle (hybrid drive device) that uses one or both of an internal combustion engine E and a rotary electric machine MG as a source of vehicle driving force. The drive device 1 is structured as a drive device for a so-called one-motor parallel type hybrid vehicle. The drive device 1 according to the present embodiment will be described below in detail.

1. Overall Structure of Drive Device

First of all, an overall structure of the drive device 1 according to the present embodiment will be described. As shown in FIG. 1, the drive device 1 is provided with an input shaft I drivingly connected to the internal combustion engine E serving as a first source of driving force of the vehicle, an output shaft O drivingly connected to wheels W, the rotary electric machine MG serving as a second source of driving force of the vehicle, and a torque converter TC. The drive device 1 is also provided with an input clutch C1 and a speed change mechanism TM. These components are arranged on a power transmission path in the order of the input shaft I, the input clutch C1, the rotary electric machine MG, the torque converter TC, the speed change mechanism TM, and the output shaft O, from the side of the internal combustion engine E. These components are housed in a case (drive device case) 3 except a part of the input shaft I and a part of the output shaft O. In the present embodiment, the input shaft I corresponds to an "input member" in the present invention, and the output shaft O corresponds to an "output member" in the present invention.

Note that, in the present embodiment, all of the input shaft I, the rotary electric machine MG, the torque converter TC, and the output shaft O are arranged on a center axis X (refer to FIG. 2), and the drive device 1 according to the present embodiment has a single-axis structure suitable for being mounted in a vehicle of an FR (front engine, rear drive) type. Note also that, in the description below, the directions of "axial direction", "radial direction", and "circumferential direction" are defined with respect to the center axis X, unless otherwise specifically distinguished. Moreover, regarding directions along the axial direction at a particular part in the drive device 1, the direction toward the side of the internal combustion engine E (left side in FIG. 2) as one side of the axial direction is referred to as an "axial first direction A1", whereas the direction toward the side of the output shaft O (right side in FIG. 2) as the other side of the axial direction is referred to as an "axial second direction A2".

The internal combustion engine E is a device to take out power by being driven by combustion of fuel inside the engine. For example, various known engines, such as a gasoline engine and a diesel engine, can be used as the internal combustion engine E. In the present example, an output rotational shaft such as a crankshaft of the internal combustion engine E is drivingly connected to the input shaft I via a first damper 16 (refer to FIG. 2). The input shaft I is drivingly connected to the rotary electric machine MG via the input clutch C1, thus being selectively drivingly connected to the rotary electric machine MG by the input clutch C1. The internal combustion engine E is drivingly connected to the rotary electric machine MG via the input shaft I while the input clutch C1 is engaged, and separated from the rotary electric machine MG while the input clutch C1 is disengaged. In the present embodiment, the input clutch C1 corresponds to an "engagement device" in the present invention.

The rotary electric machine MG is structured to have a stator St and a rotor Ro, and can serve as a motor (electric motor) producing power by receiving electric power supply and as a generator (electric generator) producing electric power by receiving power supply. Therefore, the rotary electric machine MG is electrically connected with an electrical storage device (not shown). In the present example, a battery is used as the electrical storage device. A capacitor or the like may also be suitably used as the electrical storage device. The rotary electric machine MG operates in a power running mode by receiving the electric power supply from the battery, or charges the battery by supplying thereto the electric power generated by a torque (here, used as a synonym of "driving force") produced by the internal combustion engine E or an inertial force of the vehicle. The rotor Ro of the rotary electric machine MG is drivingly connected to a pump impeller 41 of the torque converter TC constituting a power transmission member T.

The torque converter TC is a device that converts a torque of one or both of the internal combustion engine E and the rotary electric machine MG and transmits the converted torque to an intermediate shaft M. The torque converter TC is provided with the pump impeller 41 drivingly connected to the rotor Ro of the rotary electric machine MG a turbine runner 51 drivingly connected to the intermediate shaft M so as to rotate as a unit therewith, and a stator 56 (refer to FIG. 2) provided between the pump impeller 41 and the turbine runner 51. The torque converter TC can transmit, via oil filled therein, a torque between the pump impeller 41 and the turbine runner 51. In that operation, when a rotational speed difference is produced between the pump impeller 41 and the turbine runner 51, a torque converted depending on a rotational speed ratio is transmitted. In the present embodiment, the torque converter TC corresponds to a "fluid coupling" in the present invention.

The torque converter TC is also provided with a lock-up clutch C2. The lock-up clutch C2 selectively drivingly connects the pump impeller 41 with the turbine runner 51. In the engaged state of the lock-up clutch C2, the torque converter TC transmits the torque of one or both of the internal combustion engine E and the rotary electric machine MG not through the oil filled inside but directly to the intermediate shaft M. The intermediate shaft M serves as an output shaft (coupling output shaft) of the torque converter TC, and also as an input shaft (speed change input shaft) of the speed change mechanism TM. In the present embodiment, the intermediate shaft M corresponds to an "intermediate output member" in the present invention.

The speed change mechanism TM is a device that changes a rotational speed of the intermediate shaft M at a predetermined speed ratio and transmits the changed speed to the output shaft O. As such a speed change mechanism TM, the present embodiment uses an automatic stepped speed change mechanism provided, in a switchable manner, with a plurality of shift speeds with different speed ratios. Note that it is possible to use, as the speed change mechanism TM, another type of mechanism such as an automatic stepless speed change mechanism that can change the speed ratio in a stepless manner, or a manual stepped speed change mechanism provided, in a switchable manner, with a plurality of shift speeds with different speed ratios. The speed change mechanism TM changes the rotational speed and converts the torque of the intermediate shaft M at a predetermined speed ratio at each point of time, and transmits the changed speed and the converted torque to the output shaft O. The rotation and the torque transmitted to the output shaft O are distributed and transmitted, via a differential gear unit DF for output, to the two right and left wheels W. The drive device 1 can thus drive the vehicle to run by transmitting the torque of one or both of the internal combustion engine E and the rotary electric machine MG to the wheels W.

2. Structures of Various Parts of Drive Device

Figure 3:
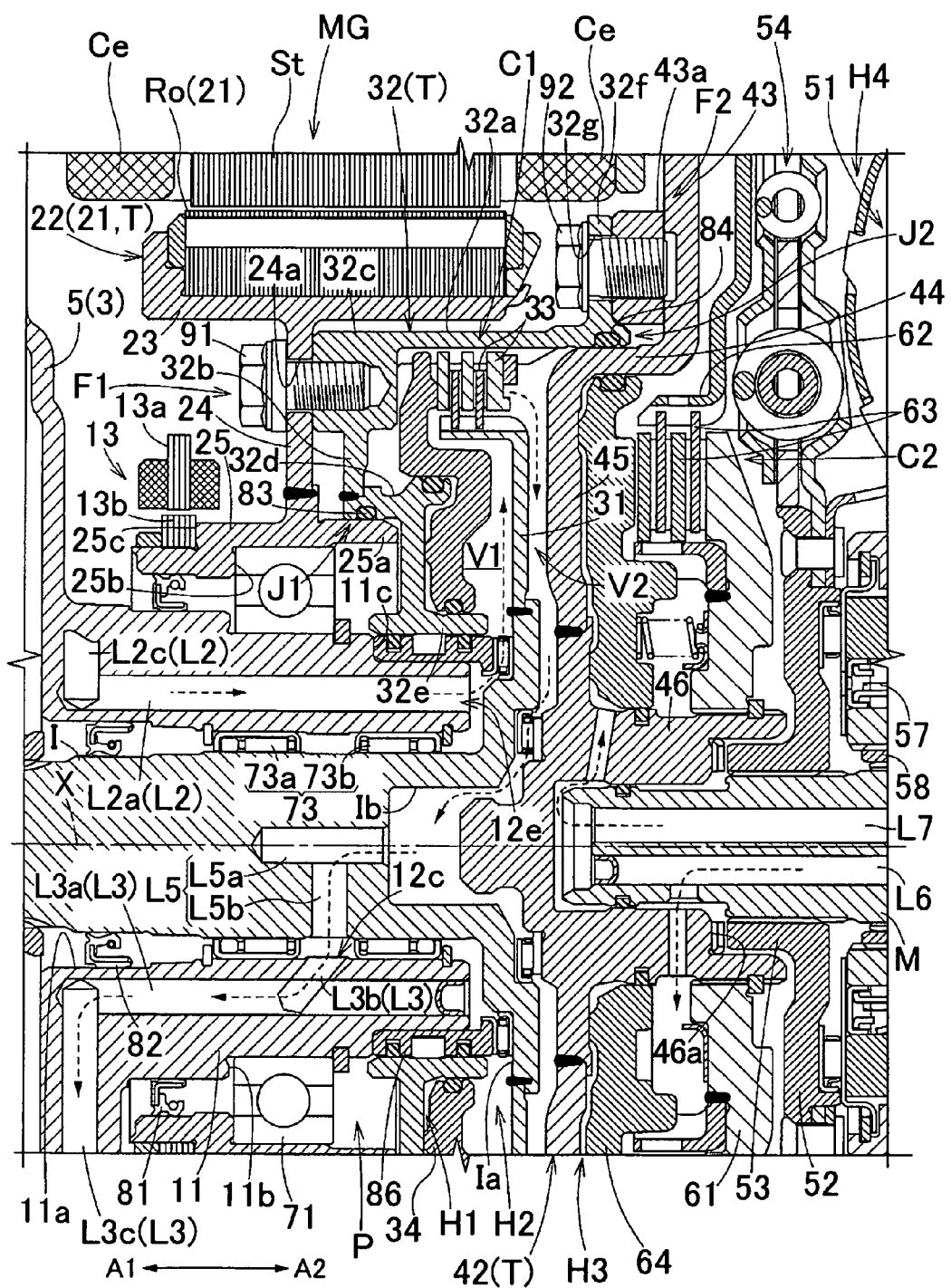
FIG. 3 is an essential part cross-sectional view of the drive device according to the embodiment of the present invention.
Figure 4:
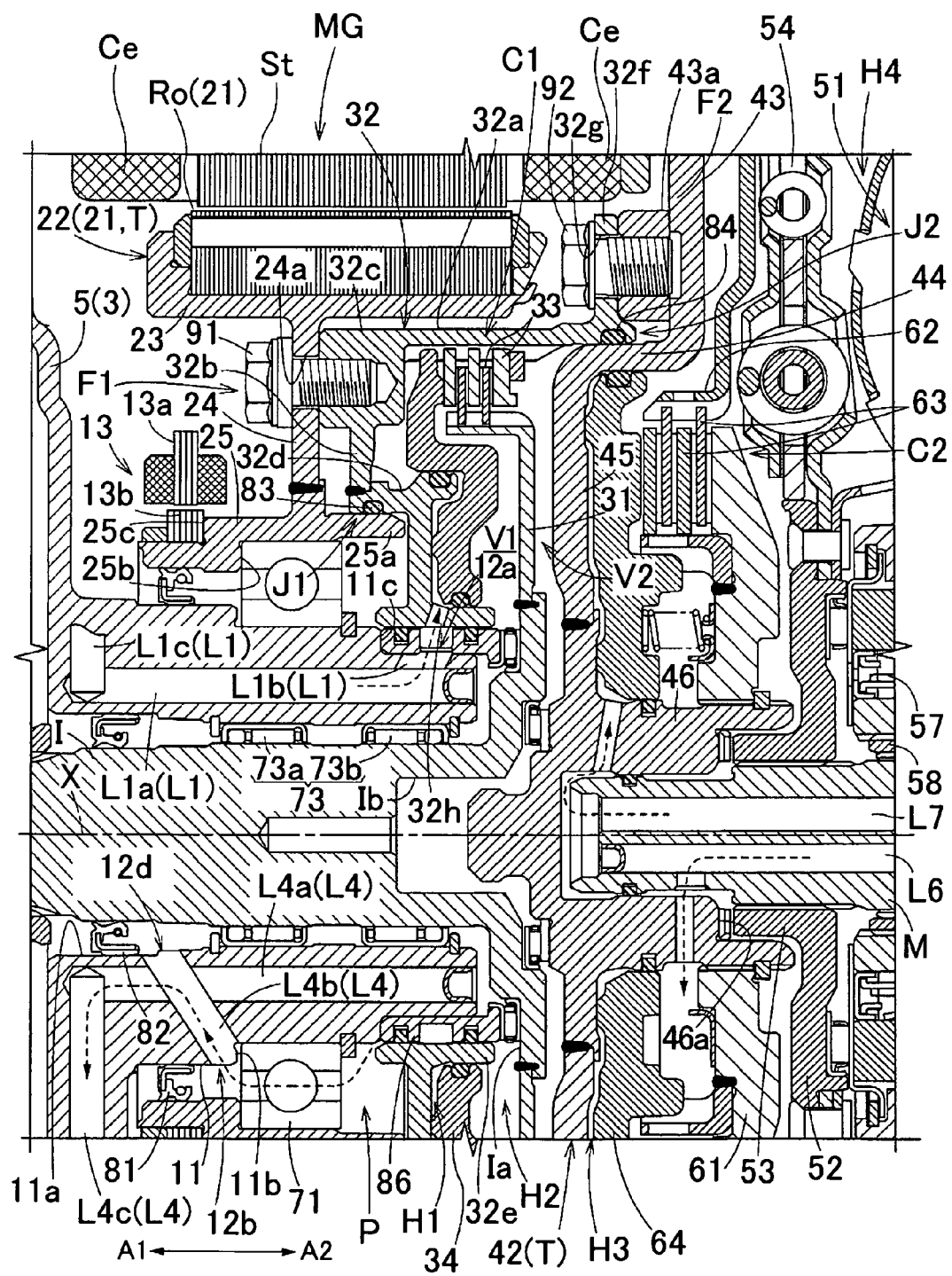
FIG. 4 is an essential part cross-sectional view of the drive device according to the embodiment of the present invention.

Next, structures of various parts of the drive device 1 according to the present embodiment will be described with reference to FIGS. 2 to 4. Note that FIG. 3 is a partial enlarged view of a cross-sectional view in FIG. 2, and FIG. 4 is a cross-sectional view at a location circumferentially different from that of FIG. 3.

2-1. Case

Figure 2:
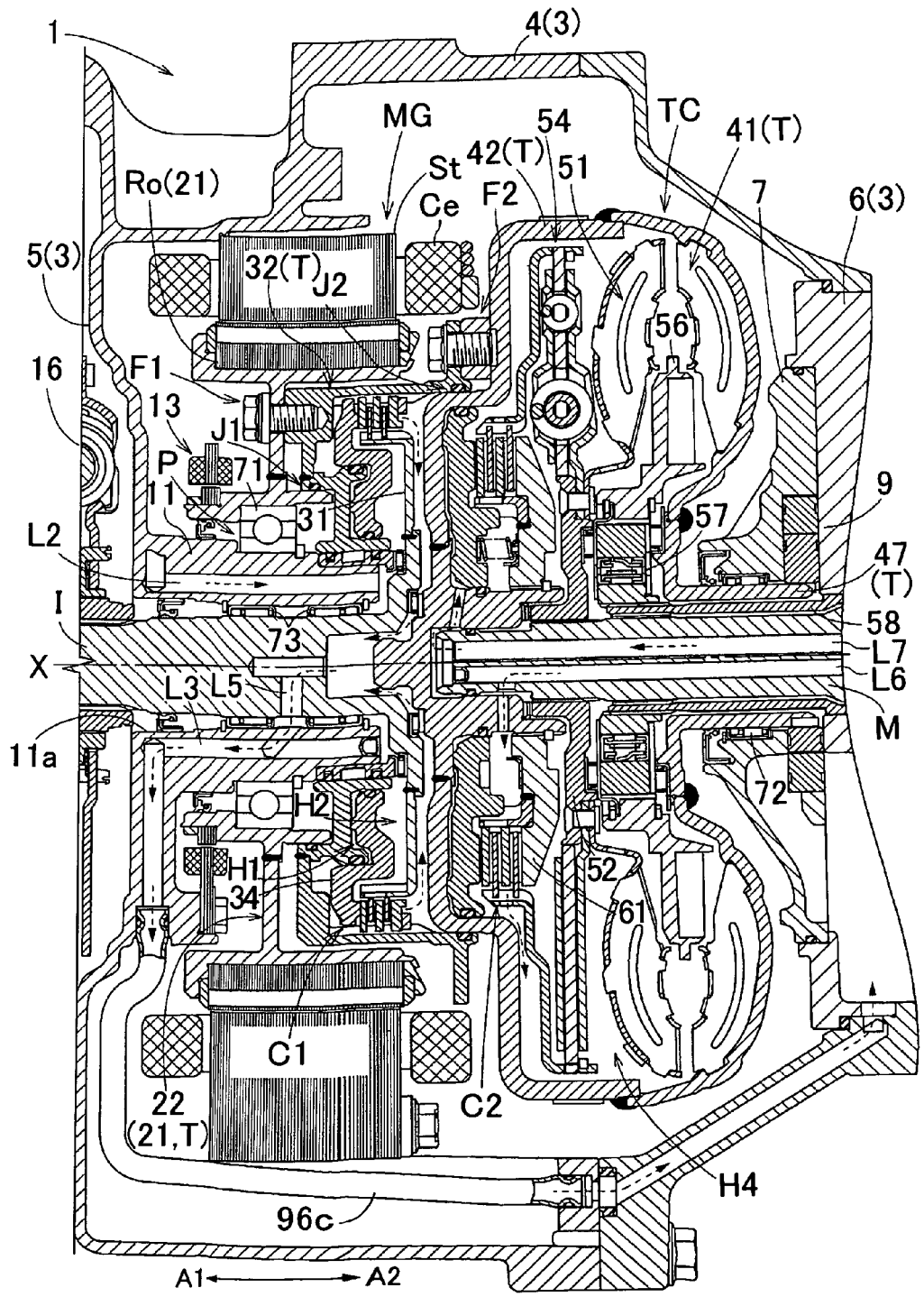
FIG. 2 is a partial cross-sectional view of the drive device according to the embodiment of the present invention.

As shown in FIG. 2, the case 3 is formed in a generally cylindrical shape. In the present embodiment, the case 3 is provided with a circumferential wall 4 having a generally cylindrical shape and covering the radially outside of parts such as the rotary electric machine MG, the input clutch C1, and the torque converter TC, an end portion support wall 5 covering the side in the axial first direction A1 of the rotary electric machine MG and the input clutch C1, and an intermediate support wall 6 covering the side in the axial second direction A2 of the torque converter TC. The rotary electric machine MG, the input clutch C1, and the torque converter TC are housed in a space in the case 3 between the end portion support wall 5 and the intermediate support wall 6. Although not shown, the speed change mechanism TM is housed in a space on the side in the axial second direction A2 relative to the intermediate support wall 6. Note that the first damper 16 is arranged in a space outside of the case 3 on the side in the axial first direction A1 relative to the end portion support wall 5.

The end portion support wall 5 has a shape that extends at least radially. Here, the end portion support wall 5 is a wall portion of a generally disc shape extending radially and circumferentially. In the present embodiment, the end portion support wall 5 corresponds to a "support wall" in the present invention. A radially central portion of the end portion support wall 5 is provided with a cylindrical projecting portion 11. The cylindrical projecting portion 11 is a projecting portion of a cylindrical shape that is coaxially arranged with respect to the center axis X and formed so as to project from the end portion support wall 5 toward the axial second direction A2. The cylindrical projecting portion 11 is provided as a unit with the end portion support wall 5. The cylindrical projecting portion 11 has a certain amount of axial length. In the example shown, the cylindrical projecting portion 11 has an axial length larger than an axial length of the rotor Ro. A radially central portion of the cylindrical projecting portion 11 is formed with a center axis through hole 11a (refer to FIG. 3, etc.) penetrating in the axial direction. Then, the input shaft I is inserted through the center axis through hole 11a. Accordingly, the input shaft I is arranged so as to penetrate through the radially inside of the cylindrical projecting portion 11, thus being inserted in the case 3 through the end portion support wall 5.

As shown in FIG. 3, etc., in the present embodiment, a first step portion 11b is provided in a predetermined axial position on the outer circumferential face of the cylindrical projecting portion 11. With the first step portion 11b as a border, the outer circumferential face of the cylindrical projecting portion 11 is formed as a large-diameter portion on the side in the axial first direction A1 relative to the first step portion 11b, and formed as a small-diameter portion on the side in the axial second direction A2 relative to the first step portion 11b. Then, a first bearing 71 is arranged so as to be in contact with the outer circumferential face of the small-diameter portion. As the first bearing 71, a bearing capable of receiving a radial load is used. In the present example, a ball bearing is used. In the present embodiment, the first bearing 71 corresponds to a "support bearing" in the present invention. Note that the first step portion 11b is provided in an axial position slightly on the side in the axial first direction A1 relative to an inner circumferential step portion 25b of a support cylindrical portion 25 to be described later.

On the outer circumferential face of the cylindrical projecting portion 11, a second step portion 11c is provided in a predetermined position on the side in the axial second direction A2 relative to the first step portion 11b. With the second step portion 11c as a border, the outer circumferential face of the cylindrical projecting portion 11 is formed in a further reduced diameter on the side in the axial second direction A2 relative to the second step portion 11c. A sleeve 86 is fitted in contact with the outer circumferential face of an end portion on the side in the axial second direction A2 of the cylindrical projecting portion 11 formed into a smaller diameter than that of the small-diameter portion in this manner. The outer diameter of the sleeve 86 coincides with the outer diameter of the small-diameter portion of the cylindrical projecting portion 11.

In the present embodiment, the cylindrical projecting portion 11 is formed with a plurality of oil passages. Specifically, as shown in FIGS. 3 and 4, the cylindrical projecting portion 11 is formed with four oil passages of a first oil passage L1, a second oil passage L2, a third oil passage L3, and a fourth oil passage L4. The first oil passage L1 is an oil supply passage that communicates with an operating oil pressure chamber H1 (to be described later) of the input clutch C1 for supplying oil to the operating oil pressure chamber H1 (refer to FIG. 4). The second oil passage L2 is an oil supply passage that communicates with a circulating oil pressure chamber H2 (to be described later) of the input clutch C1 for supplying oil to the circulating oil pressure chamber H2 (refer to FIG. 3). The third oil passage L3 is an oil discharge passage for returning the oil discharged from the circulating oil pressure chamber H2 to an oil pan (not shown) (refer to FIG. 3). The fourth oil passage L4 is an oil discharge passage for returning the oil discharged from a bearing arrangement space P (to be described later) to the oil pan (not shown) (refer to FIG. 4). Details of these oil passages will be described later.

The intermediate support wall 6 has a shape that extends at least radially. Here, the intermediate support wall 6 is a wall portion of a flat disc shape extending radially and circumferentially. In the present embodiment, the intermediate support wall 6 is structured as a separate member from the end portion support wall 5. The intermediate support wall 6 is also structured as a separate member from the circumferential wall 4, and fastened to a step portion provided on the inner circumferential face of the circumferential wall 4 by fastening members such as bolts. The intermediate support wall 6 is provided with an oil pump 9. Here, a pump cover 7 is mounted on a surface on the side in the axial first direction A1 of the intermediate support wall 6, and a pump rotor is housed in a pump chamber formed between the intermediate support wall 6 and the pump cover 7. In the present embodiment, the intermediate support wall 6 and the pump cover 7 constitute a "second support wall" in the present invention. A radially central portion of the intermediate support wall 6 and the pump cover 7 is formed with an axially penetrating through hole, through which the intermediate shaft M is inserted. A fixed shaft 58 and a pump drive shaft 47 are also inserted through this through hole. The fixed shaft 58 is a shaft portion of a cylindrical shape that is fixed to the intermediate support wall 6 and supports the stator 56 of the torque converter TC. The fixed shaft 58 is coaxially arranged with respect to the center axis X, on the radially outside of the intermediate shaft M. The pump drive shaft 47 is a shaft portion of a cylindrical shape that rotates as a unit with the pump impeller 41 of the torque converter TC. The pump drive shaft 47 is coaxially arranged with respect to the center axis X, on the radially outside of the fixed shaft 58.

In the present embodiment, the oil pump 9 is an internal gear pump having a pump rotor constituted of an inner rotor and an outer rotor. The pump rotor of the oil pump 9 is drivingly connected so as to rotate as a unit with the pump impeller 41 via the pump drive shaft 47. Consequently, the oil pump 9 discharges oil in accordance with the rotation of the pump impeller 41, thereby generating hydraulic pressure for supplying the oil to various parts of the drive device 1. The intermediate support wall 6 and the pump cover 7 are formed with a suction oil passage and a discharge oil passage of the oil pump 9. As partially shown in FIG. 2, etc., oil passages for oil supply such as described above are provided inside the case 3 (including the end portion support wall 5 and the cylindrical projecting portion 11) and various shafts of the drive device 1.

2-2. Rotary Electric Machine

As shown in FIG. 2, the rotary electric machine MG is arranged in a position on the side in the axial second direction A2 relative to the end portion support wall 5 and on the side in the axial first direction A1 relative to the torque converter TC. The rotary electric machine MG is also arranged on the radially outside of the input shaft I and the input clutch C1. The rotary electric machine MG and the input clutch C1 are arranged in positions having portions overlapping with each other when viewed radially. Note that the expression "having a portion overlapping when viewed in a certain direction" regarding arrangement of two members means that, when a view point is moved in each direction perpendicular to a line of sight with the certain direction serving as the line of sight, the view point from which the two members look overlapped with each other exists in at least a part of the area. The stator St of the rotary electric machine MG is fixed to the case 3. The rotor Ro is arranged on the radially inside of the stator St. The rotor Ro is arranged in a manner opposed to the stator St with a small space radially provided therebetween, and is supported in a rotatable state by the case 3. Specifically, a rotor support member 22 supporting the rotor Ro so as to rotate as a unit therewith is supported in a rotatable manner relative to the cylindrical projecting portion 11 of the case 3 via the first bearing 71. In the present embodiment, the rotor Ro corresponds to a "rotor body" in the present invention.

As shown in FIGS. 2 to 4, the rotor support member 22 is a member that supports the rotor Ro of the rotary electric machine MG from the radially inside. The rotor support member 22 is arranged on the side in the axial first direction A1 relative to the input clutch C1. The rotor support member 22 is formed in a shape that extends at least radially, so as to support the rotor Ro against the first bearing 71 arranged on the radially inside of the rotor Ro. In the present embodiment, the rotor support member 22 is provided with a rotor holding portion 23, a radially extending portion 24, and the support cylindrical portion 25.

The rotor holding portion 23 is a portion that holds the rotor Ro. The rotor holding portion 23 is coaxially arranged with respect to the center axis X, and formed in a circular ring shape in contact with the inner circumferential face and both axial side faces of the rotor Ro. The radially extending portion 24 is formed, as a unit with the rotor holding portion 23, so as to extend radially inward from near the axially central portion of the rotor holding portion 23. In the present example, the radially extending portion 24 is an annular plate-shaped portion extending radially and circumferentially. In the present example, the radially extending portion 24 has a flat plate shape with an almost uniform thickness regardless of radial or circumferential position. A plurality of circumferential locations of the radially extending portion 24 are provided with first bolt insert holes 24a. First bolts 91 are inserted through the first bolt insert holes 24a for fastening the rotor support member 22 with a cylindrical connecting member 32. In the present embodiment, a radially inside end portion of the radially extending portion 24 is provided with the support cylindrical portion 25 in an integrated manner.

The support cylindrical portion 25 is a cylindrical portion that is coaxially arranged with respect to the center axis X, and formed so as to extend toward both axial sides relative to the radially extending portion 24. In the present embodiment, the first bearing 71 is arranged on the inner circumferential face of the support cylindrical portion 25, and the rotor support member 22 is supported by the first bearing 71 that is arranged between the inner circumferential face of the support cylindrical portion 25 and the outer circumferential face of the cylindrical projecting portion 11. The rotor support member 22 is thus supported on the outer circumferential face of the cylindrical projecting portion 11 in a rotatable state via the first bearing 71.

The inner circumferential step portion 25b is provided in a predetermined axial position on the inner circumferential face of the support cylindrical portion 25. Regarding the inner circumferential step portion 25b as a border, the inner circumferential face of the support cylindrical portion 25 is formed as an inner circumferential small-diameter portion on the side in the axial first direction A1 relative to the inner circumferential step portion 25b, and formed as an inner circumferential large-diameter portion on the side in the axial second direction A2 relative to the inner circumferential step portion 25b. Then, the first bearing 71 is arranged so as to be in contact with the inner circumferential face of the inner circumferential large-diameter portion and with a side face on the side in the axial second direction A2 of the inner circumferential step portion 25b. Note that, in the present embodiment, the inner circumferential step portion 25b is provided on the side in the axial first direction A1 relative to the radially extending portion 24. The first bearing 71 is arranged in a position having a portion overlapping with the radially extending portion 24 when viewed radially.

On the outer circumferential face of the support cylindrical portion 25, an outer circumferential step portion 25c is provided in a predetermined position on the side in the axial first direction A1 relative to the radially extending portion 24. With the outer circumferential step portion 25c as a border, the outer circumferential face of the support cylindrical portion 25 is formed as an outer circumferential small-diameter portion on the side in the axial first direction A1 relative to the outer circumferential step portion 25c, and formed as an outer circumferential large-diameter portion on the side in the axial second direction A2 relative to the outer circumferential step portion 25c. Note that the outer circumferential step portion 25c is provided on the side in the axial first direction A1 relative to the inner circumferential step portion 25b. The support cylindrical portion 25 is provided as a unit with the radially extending portion 24 at the outer circumferential large-diameter portion. Furthermore, a sensor rotor 13b of a rotation sensor 13 is mounted so as to be in contact with the outer circumferential face of the outer circumferential small-diameter portion and with a side face on the side in the axial first direction A1 of the outer circumferential step portion 25c. On the radially outside of the sensor rotor 13b, a sensor stator 13a is arranged in a manner opposed to the sensor rotor 13b with a small space radially provided therebetween. As shown in FIG. 2, the sensor stator 13a is fixed to a predetermined sensor stator mounting portion provided on the end portion support wall 5. Note that the rotation sensor 13 is a sensor for detecting a rotational position of the rotor Ro relative to the stator St of the rotary electric machine MG, and the present example uses a resolver for the rotation sensor 13.

In the present embodiment, a cylindrical portion of the support cylindrical portion 25 located on the side in the axial second direction A2 relative to the radially extending portion 24 serves as a fitting projecting portion 25a. That is, the rotor support member 22 has the cylindrical fitting projecting portion 25a projecting from the radially extending portion 24 toward the axial second direction A2. The fitting projecting portion 25a axially extends at least by a required fitting length. As will be described later, a cylindrical extending portion 32d of the cylindrical connecting member 32 is fitted onto the fitting projecting portion 25a while being radially in contact therewith.

In the present embodiment, a first seal member 81 is arranged between the rotor support member 22 and the cylindrical projecting portion 11, on the side in the axial first direction A1 relative to the first bearing 71. Here, the first seal member 81 is arranged between the inner circumferential small-diameter portion of the support cylindrical portion 25 and the large-diameter portion of the cylindrical projecting portion 11. The first seal member 81 seals between the support cylindrical portion 25 and the cylindrical projecting portion 11, thereby suppressing the oil after, for example, lubricating the first bearing 71 from reaching the rotation sensor 13, the stator St of the rotary electric machine MG, or the like. Note that the first bearing 71 is arranged in a space defined by the outer circumferential face of the cylindrical projecting portion 11, the inner circumferential face of the support cylindrical portion 25, and the first seal member 81, and this space is a "bearing arrangement space P" in the present embodiment.

2-3. Input Clutch

The input clutch C1 is a friction engagement device that selectively drivingly connects the input shaft I with the rotary electric machine MG and the torque converter TC. The input clutch C1 is structured as a wet-type multi-plate clutch mechanism. As shown in FIG. 2, the input clutch C1 is arranged between the rotor support member 22 and the torque converter TC in the axial direction. That is, the input clutch C1 is arranged in a position on the side in the axial second direction A2 relative to the rotor support member 22 and on the side in the axial first direction A1 relative to the torque converter TC. The input clutch C1 is arranged axially adjacent to the torque converter TC. The input clutch C1 is also arranged between the cylindrical projecting portion 11 and the rotor Ro of the rotary electric machine MG in the radial direction. That is, the input clutch C1 is arranged on the radially outside relative to the cylindrical projecting portion 11 and the radially inside relative to the rotor Ro. The cylindrical projecting portion 11, the input clutch C1, and the rotor Ro are arranged so as to have portions overlapping with each other when viewed radially. The input clutch C1 is provided with a clutch hub 31, the cylindrical connecting member 32, friction members 33, a piston 34, and the operating oil pressure chamber H1.

The input clutch C1 has, as the friction members 33, an input-side friction member and an output-side friction member, serving as a pair. Here, the input clutch C1 has a plurality (two, in the present example) of such input-side friction members and a plurality (two, in the present example) of such output-side friction members, and these members are axially alternately arranged. Each of the plurality of friction members 33 is formed in an annular plate shape. In the present embodiment, the friction members 33 correspond to an "engagement member" in the present invention.

The clutch hub 31 is an annular plate-shaped member radially extending so as to support the plurality of input-side friction members (hub-side friction members, in the present example) from the radially inside. The clutch hub 31 is provided so as to radially extend by passing through between the piston 34 and a cover portion 42 (to be described later) of the torque converter TC in the axial direction, and a radially inside end portion of the clutch hub 31 is connected to the input shaft I. Here, the input shaft I has a flange portion Ia extending radially outward by passing through between the cylindrical projecting portion 11 and the cover portion 42 in the axial direction. A radially outside end portion of the flange portion Ia is connected with the radially inside end portion of the clutch hub 31 by joining through welding or the like. The input shaft I and the clutch hub 31 are thus connected so as to rotate as a unit with each other. An "input transmission member" is constituted by the input shaft I and the clutch hub 31. Note that the clutch hub 31 is a member to which the rotation and the torque of the internal combustion engine E are transmitted via the input shaft I, and serves as an input-side rotational member of the input clutch C1. In the present embodiment, the clutch hub 31 corresponds to an "engagement input side member" in the present invention.

The cylindrical connecting member 32 is a generally cylindrical member provided so as to cover at least the radially outside of the plurality of friction members 33 and also to support the output-side friction members (drum-side friction members, in the present example) from the radially outside. The cylindrical connecting member 32 is structured so as to function as a clutch drum of the input clutch C1. Furthermore, the cylindrical connecting member 32 has a portion formed in a bowl shape as a whole so as to further cover the side in the axial first direction A1 of the piston 34 and the radially outside of the piston 34. In the present embodiment, the cylindrical connecting member 32 is structured as a separate member independent of the rotor support member 22 and the cover portion 42 of the torque converter TC. Then, the cylindrical connecting member 32 is connected to the rotor support member 22 and to the cover portion 42. The cylindrical connecting member 32 is an output-side rotational member of the input clutch C1 that is paired with the clutch hub 31 to transmit, in the engaged state of the input clutch C1, rotation and torque introduced to the clutch hub 31 to the torque converter TC provided on the side of the output shaft O. In the present embodiment, the cylindrical connecting member 32 corresponds to an "engagement output side member" in the present invention.

As shown in FIGS. 3 and 4, the cylindrical connecting member 32 serving as a clutch drum is provided with an axially extending portion 32a, a radially extending portion 32b, the cylindrical extending portion 32d, a cylindrical projecting portion 32e, and a radial extension portion 32f. The axially extending portion 32a is coaxially arranged with respect to the center axis X, and formed in a cylindrical shape so as to extend outward over a predetermined axial range. The axially extending portion 32a is provided along the axial direction so as to be in contact with the radially extending portion 24 of the rotor support member 22 at least on the side in the axial first direction A1, and with the cover portion 42 of the torque converter TC on the side in the axial second direction A2. As will be described later, the cover portion 42 is fitted onto the axially extending portion 32a while being radially in contact therewith. Furthermore, the axially extending portion 32a is arranged in a manner opposed to the rotor holding portion 23 of the rotor support member 22 with a predetermined space radially provided therebetween.

The radial extension portion 32f is provided as a unit with the axially extending portion 32a, and formed in an annular plate shape so as to extend radially outward from an end portion on the side in the axial second direction A2 of the axially extending portion 32a. A plurality of circumferential locations of the radial extension portion 32f are provided with second bolt insert holes 32g. Second bolts 92 are inserted through the second bolt insert holes 32g for fastening the cover portion 42 with the cylindrical connecting member 32. The radial extension portion 32f is arranged in a position that is located on the radially inside of a coil end portion Ce on the side in the axial second direction A2 of the stator St and that has a portion overlapping with the coil end portion Ce when viewed radially. The radial extension portion 32f is also arranged in a position that is located on the side in the axial second direction A2 of the rotor Ro and that has a portion overlapping with the rotor Ro when viewed axially.

The radially extending portion 32b is provided as a unit with the axially extending portion 32a, and formed in a generally annular plate shape so as to extend radially inward from an end portion on the side in the axial first direction A1 of the axially extending portion 32a. A junction between the axially extending portion 32a and the radially extending portion 32b is provided as a thick-walled portion having predetermined thickness in the axial and radial directions, and the thick-walled portion serves as a mounting portion 32c for assembling the cylindrical connecting member 32 with the rotor support member 22. A plurality of circumferential locations of the mounting portion 32c are provided with first bolt holes into which the first bolts 91 are tightened. The radially extending portion 32b has also the cylindrical extending portion 32d that is structured as a unit with the radially extending portion 32b so as to axially extend on the radially inside relative to the mounting portion 32c. That is, the radially extending portion 32b is formed so as to have a shape in which the radially inside portion relative to the cylindrical extending portion 32d is offset in the axial second direction A2 from the radially outside portion. The cylindrical extending portion 32d is fitted onto the fitting projecting portion 25a of the rotor support member 22 while being radially in contact therewith.

The cylindrical projecting portion 32e is provided as a unit with the radially extending portion 32b, and formed in a cylindrical shape so as to project at least toward the axial second direction A2 from a radially inside end portion of the radially extending portion 32b. In the present example, the cylindrical projecting portion 32e extends toward both axial sides relative to the radially extending portion 32b. The cylindrical projecting portion 32e is arranged in a position that is located on the radially inside of the friction members 33 and that has a portion overlapping with the friction members 33 when viewed radially. The cylindrical projecting portion 32e is also arranged on the radially outside of the end portion on the side in the axial second direction A2 of the cylindrical projecting portion 11 of the case 3, in a manner radially opposed to the cylindrical projecting portion 11 with a predetermined space provided therebetween. Then, the sleeve 86 is arranged between the cylindrical projecting portion 32e and the cylindrical projecting portion 11 of the case 3. That is, the sleeve 86 is arranged so as to be in contact with the inner circumferential face of the cylindrical projecting portion 32e and the outer circumferential face of the cylindrical projecting portion 11 of the case 3. Note that, in the present embodiment, the case 3 including the cylindrical projecting portion 11 is made of aluminum, and the cylindrical connecting member 32 including the cylindrical projecting portion 32e is made of iron. Therefore, the sleeve 86 is made of iron for the purpose of suppressing wear of the cylindrical projecting portion 11 caused by relative rotation between the cylindrical projecting portion 11 of the case 3 and the cylindrical projecting portion 32e of the cylindrical connecting member 32. In the present embodiment, the cylindrical projecting portion 32e corresponds to an "opposed cylindrical portion" in the present invention.

The piston 34 that presses the friction members 33 along the pressing direction to operate the friction members 33 is arranged so as to be slidable along the axial direction relative to the outer circumferential faces of the cylindrical extending portion 32d and the cylindrical projecting portion 32e. In the present embodiment, the piston 34 is arranged so as to press the friction members 33 from the axial first direction A1. In the present example, the axial second direction A2 corresponds to the "pressing direction" mentioned above. Seal members such as O-rings are arranged between the cylindrical extending portion 32d and the piston 34, and between the cylindrical projecting portion 32e and the piston 34. The operating oil pressure chamber H1 is thus formed as a space defined and sealed by the radially extending portion 32b, the cylindrical extending portion 32d, the cylindrical projecting portion 32e, and the piston 34. The operating oil pressure chamber H1 is supplied with oil for operating the piston 34 via the first oil passage L1.

The circulating oil pressure chamber H2 is formed on the side of the piston 34 opposite to the operating oil pressure chamber H1 (here, on the side in the axial second direction A2 of the piston 34). That is, the circulating oil pressure chamber H2 is formed so as to apply a hydraulic pressure to the side (side in the axial second direction A2, in the present example) opposite to the side (side in the axial first direction A1, that is, the side of the internal combustion engine E, in the present example) to which a hydraulic pressure for operating the piston 34 is applied with the oil supplied. The circulating oil pressure chamber H2 is formed as a space defined mainly by the piston 34, the axially extending portion 32a, the cover portion 42 of the torque converter TC, the cylindrical projecting portion 11, and the above-mentioned input transmission members (input shaft I and clutch hub 31). The circulating oil pressure chamber H2 is thus arranged between the operating oil pressure chamber H1 and the cover portion 42 of the torque converter TC in the axial direction. Here, in the present embodiment, a second seal member 82 is arranged between the cylindrical projecting portion 11 and the input shaft I constituting the input transmission member so as to seal therebetween. A fourth seal member 84 is arranged between the axially extending portion 32a and the cover portion 42 so as to seal therebetween. The circulating oil pressure chamber H2 is thus formed as a sealed space.

The circulating oil pressure chamber H2 is supplied, via the second oil passage L2, with pressurized oil that is discharged by the oil pump 9 and regulated to a predetermined pressure level by a hydraulic pressure control device (not shown). By being supplied with the oil via the second oil passage L2, the circulating oil pressure chamber H2 is basically placed in a state of being filled with oil at a predetermined pressure or more. In the present embodiment, the hydraulic pressure supplied to the circulating oil pressure chamber H2 via the second oil passage L2 is applied to the piston 34 on the side opposite to the side to which the hydraulic pressure (hydraulic pressure for operating the piston 34) supplied to the operating oil pressure chamber H1 is applied. Furthermore, the hydraulic pressure supplied to the circulating oil pressure chamber H2 is regulated to be different from the hydraulic pressure supplied to the operating oil pressure chamber H1. Accordingly, engagement and disengagement of the input clutch C1 can be controlled by sliding the piston 34 along the axial direction in response to a differential pressure between the hydraulic pressure applied from the operating oil pressure chamber H1 located on the side in the axial first direction A1 relative to the piston 34 and the hydraulic pressure applied from the circulating oil pressure chamber H2 located on the side in the axial second direction A2 relative to the piston 34. That is, by reducing the hydraulic pressure supplied to the operating oil pressure chamber H1 to be lower than the hydraulic pressure supplied to the circulating oil pressure chamber H2, the piston 34 can be moved in the axial first direction A1 so as to place the input clutch C1 in the disengaged state. On the other hand, by increasing the hydraulic pressure supplied to the operating oil pressure chamber H1 to be higher than the hydraulic pressure supplied to the circulating oil pressure chamber H2, the piston 34 can be moved in the axial second direction A2 to frictionally engage the friction members 33 with each other so as to place the input clutch C1 in the engaged state.

The end portion on the side in the axial second direction A2 of the cylindrical projecting portion 11 is arranged in the circulating oil pressure chamber H2. Also, the flange portion Ia of the input shaft I inserted through the radially inside of the cylindrical projecting portion 11 is arranged in the circulating oil pressure chamber H2 so as to extend radially outward on the side in the axial second direction A2 of the cylindrical projecting portion 11. Moreover, the clutch hub 31 connected to the flange portion Ia is arranged so as to radially extend in the circulating oil pressure chamber H2, in which the plurality of friction members 33 are also arranged. In the present embodiment, the plurality of friction members 33 can be cooled efficiently by the oil filled in the circulating oil pressure chamber H2. In the present embodiment, the circulating oil pressure chamber H2 corresponds to an "engagement member housing chamber" in the present invention.

2-4. Torque Converter

As shown in FIG. 2, the torque converter TC is arranged in a position on the side in the axial second direction A2 relative to the rotary electric machine MG and the input clutch C1, and on the side in the axial first direction A1 relative to the intermediate support wall 6 and the speed change mechanism TM. The torque converter TC is arranged axially adjacent to the input clutch C1. The torque converter TC is provided with the pump impeller 41, the turbine runner 51, the stator 56, and the cover portion 42 housing these parts.

The cover portion 42 is structured so as to rotate as a unit with the pump impeller 41. Here, the pump impeller 41 is provided inside the cover portion 42 in an integrated manner. The cover portion 42 is also connected to the cylindrical connecting member 32. The cover portion 42 is thus drivingly connected so as to rotate as a unit with the rotor Ro of the rotary electric machine MG via the cylindrical connecting member 32 and the rotor support member 22. Accordingly, the pump impeller 41 and the cover portion 42 are members to which the rotation and the torque of one or both of the internal combustion engine E and the rotary electric machine MG are transmitted, and are input-side rotational members of the torque converter TC. The cover portion 42 is also connected to the pump drive shaft 47. The cover portion 42 is drivingly connected so as to rotate as a unit with the pump rotor of the oil pump 9 via the pump drive shaft 47. The pump drive shaft 47 is radially supported by the pump cover 7 in a rotatable state via a second bearing 72 provided in the through hole of the pump cover 7. In the present embodiment, the pump impeller 41, the cover portion 42, and the pump drive shaft 47 constitute a "coupling input side member" in the present invention.

The turbine runner 51 is arranged on the side in the axial first direction A1 of the pump impeller 41 in a manner opposed to the pump impeller 41. The turbine runner 51 is an output-side rotational member of the torque converter TC that is paired with the pump impeller 41 to transmit the rotation and the torque input to the pump impeller 41 to the intermediate shaft M provided on the side of the output shaft O. In the present embodiment, the turbine runner 51 corresponds to a "coupling output side member" in the present invention. The turbine runner 51 has a radially extending portion 52. The radially extending portion 52 is arranged between a cylindrical extending portion 46 (refer to FIG. 3, etc.) to be described later and a one-way clutch 57 in the axial direction. Furthermore, the turbine runner 51 has a cylindrical projecting portion 53 (refer to FIG. 3) that is provided as a unit with the radially extending portion 52 and projects toward the axial first direction A1 from a radially inside end portion of the radially extending portion 52. In the present embodiment, the cylindrical projecting portion 53 is connected via splines with the intermediate shaft M arranged so as to penetrate through the cylindrical projecting portion 53.

The stator 56 is arranged between the pump impeller 41 and the turbine runner 51 in the axial direction. The stator 56 is supported by the fixed shaft 58 via the one-way clutch 57. As described above, the fixed shaft 58 is a shaft portion of a cylindrical shape that is fixed, on the side in the axial second direction A2 thereof, to the intermediate support wall 6 of the case 3. Accordingly, the stator 56 is connected to the intermediate support wall 6 via the one-way clutch 57 and the fixed shaft 58. The one-way clutch 57 is arranged between the radially extending portion 52 and the pump drive shaft 47 in the axial direction.

In the present embodiment, a body portion of the torque converter TC is constituted by the pump impeller 41 and the turbine runner 51 arranged in a manner opposed to each other. Furthermore, the cover portion 42 holding the pump impeller 41 from outside is arranged so as to house also the turbine runner 51. That is, the cover portion 42 is arranged so as to house the body portion of the torque converter TC. In the present embodiment, the cover portion 42 also houses therein the lock-up clutch C2 and a second damper 54 arranged on the side in the axial first direction A1 relative to the body portion of the torque converter TC. In the present embodiment, the space in the cover portion 42 housing these parts such as the body portion is referred to as a "body portion housing chamber H4". The body portion housing chamber H4 is supplied with oil via a sixth oil passage L6 formed inside the intermediate shaft M. Torque transmission between the pump impeller 41 and the turbine runner 51 can be effected via the oil in the body portion housing chamber H4. In the present embodiment, the sixth oil passage L6 corresponds to a "coupling supply oil passage" in the present invention.

The cover portion 42 is provided so as to cover both axial sides and the radially outside relative to the body portion, the lock-up clutch C2, and the second damper 54. Therefore, as shown in FIGS. 3 and 4, the cover portion 42 has an outer radially extending portion 43, an axially extending portion 44, an inner radially extending portion 45, and the cylindrical extending portion 46, on the side in the axial first direction A1 relative to the body portion.

The axially extending portion 44 is a cylindrical portion extending along the axial direction over a predetermined range. The axially extending portion 44 is provided in an approximately intermediate position in an area radially occupied by a portion of the cover portion 42 located on the side in the axial first direction A1 relative to the body portion. The axially extending portion 44 is fitted onto the axially extending portion 32a of the cylindrical connecting member 32 while being radially in contact therewith. The outer radially extending portion 43 is provided as a unit with the axially extending portion 44, and formed in an annular plate shape so as to extend radially outward from an end portion on the side in the axial second direction A2 of the axially extending portion 44. The outer radially extending portion 43 is arranged so as to radially extend by passing through between the rotary electric machine MG and the second damper 54 in the axial direction. The inner radially extending portion 45 is provided as a unit with the axially extending portion 44, and formed in a generally disc shape so as to extend radially inward from an end portion of the axially extending portion 44 on the side in the axial first direction A1. The inner radially extending portion 45 is arranged so as to radially extend by passing through between the input clutch C1 and the lock-up clutch C2 in the axial direction. A radially center portion of the inner radially extending portion 45 is arranged between the input shaft I and the intermediate shaft M in the axial direction. Note that the cover portion 42 is formed in a stepped bowl shape as a whole by a cylindrical portion covering the radially outside of the second damper 54, the outer radially extending portion 43, the axially extending portion 44, and the inner radially extending portion 45.

The cylindrical extending portion 46 is structured as a unit with the inner radially extending portion 45, and formed in a cylindrical shape so as to extend toward the axial second direction A2 from the radially center portion of the inner radially extending portion 45. In the present embodiment, a step portion 46a is provided in a predetermined axial position on the inner circumferential face of the cylindrical extending portion 46. With the step portion 46a as a border, the inner circumferential face of the cylindrical extending portion 46 is formed as a small-diameter portion on the side in the axial first direction A1 relative to the step portion 46a, and formed as a large-diameter portion on the side in the axial second direction A2 relative to the step portion 46a. Then, an end portion on the side in the axial first direction A1 of the intermediate shaft M is arranged on the radially inside of the small-diameter portion. Furthermore, the cylindrical projecting portion 53 of the turbine runner 51 is arranged in a position on the radially inside of the large-diameter portion and on the radially outside of the intermediate shaft M. The cylindrical extending portion 46 is arranged on the side in the axial first direction A1 relative to the one-way clutch 57 and the radially extending portion 52 of the turbine runner 51.

The lock-up clutch C2 is a friction engagement device that selectively drivingly connects the pump impeller 41 rotating as a unit with the cover portion 42 and the turbine runner 51. The lock-up clutch C2 is structured as a wet-type multi-plate clutch mechanism. The lock-up clutch C2 is arranged in a position that is located on the radially inside of the axially extending portion 44 of the cover portion 42 and that has a portion overlapping with the axially extending portion 44 when viewed radially. The lock-up clutch C2 is also arranged on the side in the axial first direction A1 relative to the turbine runner 51. Moreover, the lock-up clutch C2 is arranged adjacent in the axial second direction A2 to the input clutch C1 with the inner radially extending portion 45 of the cover portion 42 in between. As shown in FIGS. 3 and 4, the lock-up clutch C2 is provided with a clutch hub 61, a clutch drum 62, friction members 63, a piston 64, and an operating oil pressure chamber H3.

The clutch hub 61 is provided so as to rotate as a unit with the cylindrical extending portion 46 constituting the cover portion 42. The clutch drum 62 is drivingly connected to the turbine runner 51 and the intermediate shaft M via the second damper 54. A plurality of such friction members 63 are arranged between the clutch hub 61 and the clutch drum 62, and the piston 64 is arranged on the side in the axial first direction A1 relative to the friction members 63. The piston 64 is also arranged so as to be slidable along the axial direction relative to the axially extending portion 44 and the cylindrical extending portion 46 constituting the cover portion 42. Seal members such as O-rings are arranged between the axially extending portion 44 and the piston 64, and between the cylindrical extending portion 46 and the piston 64. The operating oil pressure chamber H3 is thus formed as a space defined and sealed by the axially extending portion 44, the inner radially extending portion 45, the cylindrical extending portion 46, and the piston 64. The operating oil pressure chamber H3 is supplied with oil for operating the piston 64 via a seventh oil passage L7 formed inside the intermediate shaft M.

In the present embodiment, the piston 64 of the lock-up clutch C2 is arranged on the radially inside of the axially extending portion 44 fitted onto the axially extending portion 32a of the cylindrical connecting member 32 while being radially in contact therewith. The axially extending portion 32a, the fourth seal member 84, the axially extending portion 44, the piston 64, and the seal members between the axially extending portion 44 and the piston 64 are arranged in positions having portions overlapping with each other when viewed radially. The axial length of the entire device is intended to be reduced accordingly. Furthermore, a structure (second radially fitting portion J2 to be described later) for mutually positioning the cylindrical connecting member 32 and the cover portion 42 in the radial direction is shared with the structure for sealing the operating oil pressure chamber H2 of the lock-up clutch C2.

In the present embodiment, the hydraulic pressure supplied to the body portion housing chamber H4 is regulated to be different from the hydraulic pressure (hydraulic pressure for operating the piston 64) supplied to the operating oil pressure chamber H3. Engagement and disengagement of the lock-up clutch C2 can be thus controlled by sliding the piston 64 along the axial direction in response to a differential pressure between the hydraulic pressure applied from the operating oil pressure chamber H3 located on the side in the axial first direction A1 relative to the piston 64 and the hydraulic pressure applied from the body portion housing chamber H4 located on the side in the axial second direction A2 relative to the piston 64. Note that, in the present embodiment, the body portion housing chamber H4 and the circulating oil pressure chamber H2 are formed as spaces independent of each other.

2-5. Power Transmission Member

The power transmission member T is a member that transmits the rotation and the torque from the source of vehicle driving force to the speed change mechanism TM. In the present embodiment, the rotation and the torque from the source of vehicle driving force are transmitted to the pump impeller 41 of the torque converter TC, and thereby transmitted to the speed change mechanism TM via the torque converter TC. Therefore, the power transmission member T according to the present embodiment is structured such that the rotor support member 22, the cylindrical connecting member 32 serving as an output-side rotational member of the input clutch C1, and the cover portion 42 of the torque converter TC are connected so as to rotate as a unit with each other.

The rotor support member 22 is connected with the cylindrical connecting member 32 by being in contact therewith at least at two locations, that is, at a first radially fitting portion J1 and a first fastening portion F1, in the present example. The first radially fitting portion J1 is a portion for mutually positioning the rotor support member 22 and the cylindrical connecting member 32 in the radial direction. In the present embodiment, each of the fitting projecting portion 25a provided in the rotor support member 22 and the cylindrical extending portion 32d provided in the cylindrical connecting member 32 has an axially extending portion. Then, in the present example, the outer circumferential face of the fitting projecting portion 25a and the inner circumferential face of the cylindrical extending portion 32d are mutually fitted while being in contact with each other over the entire circumference thereof, and thereby, the rotor support member 22 and the cylindrical connecting member 32 are mutually positioned in the radial direction. In this manner, in the present embodiment, the first radially fitting portion J1 is structured by the fitting projecting portion 25a of the rotor support member 22 and the cylindrical extending portion 32d of the cylindrical connecting member 32. In the present embodiment, the first radially fitting portion J1 corresponds to a "radially fitting portion" in the present invention. Note that, in the present embodiment, a third seal member 83 such as an O-ring is further arranged between the fitting projecting portion 25a and the cylindrical extending portion 32d constituting the first radially fitting portion J1. The structure (the first radially fitting portion J1) for mutually positioning the rotor support member 22 and the cylindrical connecting member 32 in the radial direction is shared with the structure for suppressing the oil from flowing out to the side of the stator St of the rotary electric machine MG by sealing the bearing arrangement space P.

The first fastening portion F1 is a portion for fastening the rotor support member 22 with the cylindrical connecting member 32. In the present embodiment, the radially extending portion 24 of the rotor support member 22 and the mounting portion 32c of the cylindrical connecting member 32 are arranged in contact with each other in the axial direction. These portions are arranged in the state in which all center axes of the plurality of first bolt insert holes 24a provided in the radially extending portion 24 coincide with all center axes of the plurality of first bolt holes provided in the mounting portion 32c. The first bolts 91 are inserted through the respective first bolt insert holes 24a to be tightened to the first bolt holes. The radially extending portion 24 and the mounting portion 32c are thus fastened with each other by the first bolts 91, thus constituting the first fastening portion F1 by the fastening portions between the radially extending portion 24 and the mounting portion 32c. Then, the rotor support member 22 and the cylindrical connecting member 32 are tightly fixed to each other without looseness by the first fastening portion F1. In the present embodiment, the first fastening portion F1 corresponds to a "fastening portion" in the present invention. Note that, in the present example, the first bolts 91, the first bolt insert holes 24a, and the first bolt holes are arranged so as to be circumferentially distributed in a plurality of sets thereof. Therefore, the term "first fastening portion F1" is used as a collective term for the plurality of sets (the same applies to a second fastening portion F2 to be described later).

The cylindrical connecting member 32 is connected with the cover portion 42 by being in contact therewith at least at two locations, that is, at the second radially fitting portion J2 and the second fastening portion F2. The second radially fitting portion J2 is a portion for mutually positioning the cylindrical connecting member 32 and the cover portion 42 in the radial direction. In the present embodiment, each of the axially extending portion 32a provided in the cylindrical connecting member 32 and the axially extending portion 44 provided in the cover portion 42 has an axially extending portion. Then, in the present example, at an open end portion on the side in the axial second direction A2 of the axially extending portion 32a, the inner circumferential face of the axially extending portion 32a and the outer circumferential face of the axially extending portion 44 are mutually fitted while being in contact with each other over the entire circumference thereof. The cylindrical connecting member 32 and the cover portion 42 are thus mutually positioned in the radial direction. In this manner, in the present embodiment, the second radially fitting portion J2 is structured by the axially extending portion 32a of the cylindrical connecting member 32 and the axially extending portion 44 of the cover portion 42. Note that, in the present embodiment, the fourth seal member 84 is arranged between the axially extending portion 32a and the axially extending portion 44. The structure (second radially fitting portion J2) for mutually positioning the cylindrical connecting member 32 and the cover portion 42 in the radial direction is shared with the structure (first seal portion) for sealing the circulating oil pressure chamber H2.

The second fastening portion F2 is a portion for fastening the cylindrical connecting member 32 with the cover portion 42. In the present embodiment, the radial extension portion 32f of the cylindrical connecting member 32 and the outer radially extending portion 43 of the cover portion 42 are arranged so as to be in contact with each other via cover-side connecting portions 43a provided at a plurality of circumferential locations. That is, the arrangement is such that the radial extension portion 32f and the cover-side connecting portions 43a are axially in contact with each other, and the cover-side connecting portions 43a and the outer radially extending portion 43 are axially in contact with each other. Note that each of the cover-side connecting portions 43a is provided with a second bolt hole into which each of the second bolts 92 is tightened. Each of the cover-side connecting portions 43a is joined by welding or the like to a side face on the side in the axial first direction A1 of the outer radially extending portion 43, so as to rotate as a unit with the cover portion 42. The radial extension portion 32f, the cover-side connecting portions 43a, and the outer radially extending portion 43 are arranged in the state in which all center axes of the plurality of second bolt insert holes 32g provided in the radial extension portion 32f coincide with all center axes of the second bolt holes provided in the plurality of cover-side connecting portions 43a. The second bolts 92 are inserted through the respective second bolt insert holes 32g to be tightened to the second bolt holes. The radial extension portion 32f and the cover-side connecting portions 43a are thus fastened with each other by the second bolts 92, and the radial extension portion 32f is connected with the outer radially extending portion 43 via the cover-side connecting portions 43a. In the present embodiment, the second fastening portion F2 is constituted by the fastening portions between the radial extension portion 32f and the outer radially extending portion 43. Then, the cylindrical connecting member 32 is tightly fixed to the cover portion 42 and the pump impeller 41 without looseness by the second fastening portion F2.

Note that, in the present embodiment, the first radially fitting portion J1 is provided radially inside relative to the first fastening portion F1. In the present embodiment, the first radially fitting portion J1 is structured by using a part of the support cylindrical portion 25 located at a radially inside end portion of the rotor support member 22, while the first fastening portion F1 is provided at a portion (portion near the rotor holding portion 23) on the radially outside of the radially extending portion 24 of the rotor support member 22. Therefore, the fitting projecting portion 25a and the cylindrical extending portion 32d constituting the first radially fitting portion J1 can be formed in a relatively small diameter. Consequently, accuracy of processing of these parts can be improved easily. Compared with the case of providing the first fastening portion F1 radially inside, it is possible, by applying the principle of leverage, to increase the maximum value of torque transmittable at the first fastening portion F1 via the first bolts 91. Note also that the second radially fitting portion J2 is provided radially inside relative to the second fastening portion F2. In the present example, the second radially fitting portion J2 and the second fastening portion F2 are arranged radially adjacent to each other.

In the present embodiment, the rotor support member 22, the cylindrical connecting member 32, and the cover portion 42 are structured as separate members independent of each other. For that reason, these members can be processed individually. Therefore, also from this point of view, each member can be easily processed into a desired form while improving accuracy of the processing. Particularly, it is easy to improve accuracy of center axes of the fitting projecting portion 25a and the cylindrical extending portion 32d constituting the first radially fitting portion J1, and accuracy of center axes of the axially extending portion 32a and the axially extending portion 44 constituting the second radially fitting portion J2, which require to be centered. Therefore, by coordination of the first fastening portion F1 and the second fastening portion F2 with the first radially fitting portion J1 and the second radially fitting portion J2, the integrated power transmission member T that is tightly connected to be fixed without looseness with a high degree of accuracy of center axis is provided as a rotational member that is in a drum shape as a whole. In the present embodiment, the operating oil pressure chamber H1 of the input clutch C1, the circulating oil pressure chamber H2, the operating oil pressure chamber H3 of the lock-up clutch C2, and the body portion housing chamber H4 are formed inside the power transmission member T provided in the manner described above.

As shown in FIG. 2, etc., the thus provided power transmission member T is radially supported, on the side in the axial first direction A1 thereof, on the outer circumferential face of the cylindrical projecting portion 11 provided as a unit with the end portion support wall 5, in a rotatable state via the first bearing 71. In the present example, as shown in FIG. 4, the first bearing 71 is arranged between the end portion support wall 5 and the cylindrical projecting portion 32e of the cylindrical connecting member 32 in the axial direction. Moreover, the first bearing 71 is arranged between the first seal member 81 and the cylindrical projecting portion 32e in the axial direction. On the other hand, the power transmission member T is radially supported, on the side in the axial second direction A2 thereof, on the inner circumferential face of the through hole of the pump cover 7 mounted on the intermediate support wall 6, in a rotatable state via the second bearing 72. As the second bearing 72, a bearing capable of receiving a radial force is employed. A needle bearing is employed in the present example. In the present embodiment, the second bearing 72 corresponds to a "second support bearing" in the present invention.

Here, the first bearing 71 and the second bearing 72 are arranged on the sides in the axial first direction A1 and the axial second direction A2, respectively, relative to the input clutch C1, the lock-up clutch C2, and the torque converter TC arranged radially inside the power transmission member T. In this manner, in the present embodiment, because the power transmission member T is radially supported over an axially long supporting span, the entire power transmission member T can be supported with a high degree of accuracy of center axis. Consequently, it is possible to improve the accuracy of supporting the input clutch C1, the rotary electric machine MG, and the torque converter TC, each of which is structured by using a part of the power transmission member T.

The input shaft I that is arranged in a state penetrating through the center axis through hole 11a of the cylindrical projecting portion 11 provided on the end portion support wall 5 is radially supported on the inner circumferential face of the cylindrical projecting portion 11, in a rotatable state via a third bearing 73. As the third bearing 73, a bearing capable of receiving a radial force is used. In the present example, a needle bearing is used. In the present embodiment, the input shaft I is radially supported against the center axis through hole 11a at a plurality of axial locations (here, at two locations). That is, the input shaft I is supported on the inner circumferential face of the cylindrical projecting portion 11 via two third bearings 73a and 73b separately arranged at a predetermined axial distance along the inner circumferential face of the cylindrical projecting portion 11. In this manner, by employing the structure of supporting the input shaft I at two points using the two third bearings 73a and 73b, the input shaft I can be reliably supported by the cylindrical projecting portion 11 while supporting accuracy can be improved. In the present embodiment, the third bearing 73 corresponds to a "third support bearing" in the present invention.

Thus, in the present embodiment, the cylindrical projecting portion 11 can support, on the inner circumferential face thereof, the input shaft I connected to the clutch hub 31 of the input clutch C1 with a high degree of accuracy of center axis. In addition, the cylindrical projecting portion 11 can also support, on the outer circumferential face thereof, the power transmission member T that includes, as a part thereof, the cylindrical connecting member 32 serving as a clutch drum of the input clutch C1 with a high degree of accuracy of center axis. Therefore, the supporting accuracy of the input clutch C1 is highly improved. As a result, an engagement state of the input clutch C1 (including an engaging pressure by the piston 34 and a transfer torque capacity of the input clutch C1) can be controlled accurately.

In the case of using a drive device such as the drive device 1 according to the present embodiment in a one-motor parallel type hybrid vehicle, it is particularly strongly requested to accurately control the engagement state of the input clutch C1, for example, when performing internal combustion engine starting control or slip acceleration control. With the drive device 1 according to the present embodiment, the supporting accuracy of the input clutch C1 is very high, and thereby, desired engagement characteristics can be obtained with a high degree of accuracy when engaging the input clutch C1. Therefore, requests as described above can be met appropriately. Note that the internal combustion engine starting control refers to control that starts the internal combustion engine E by a torque of the rotary electric machine MG transmitted via the input clutch C1, and the slip acceleration control refers to control that accelerates the vehicle at least by a torque of the internal combustion engine E transmitted via the input clutch C1 with a slip between the input-side friction members and the output-side friction members of the input clutch C1.

3. Structure for Supplying Oil to Input Clutch

Next, description will be made of a structure for supplying oil to the operating oil pressure chamber H1 and the circulating oil pressure chamber H2 included in the input clutch C1 according to the present embodiment. Description will also be made of a structure for discharging oil from the circulating oil pressure chamber H2, etc. In the present embodiment, these structures are achieved by being mainly constituted by the four oil passages (first oil passage L1, second oil passage L2, third oil passage L3, and fourth oil passage L4) formed in the end portion support wall 5 and the cylindrical projecting portion 11 of the case 3. The description will be made below in detail.

Figure 5:
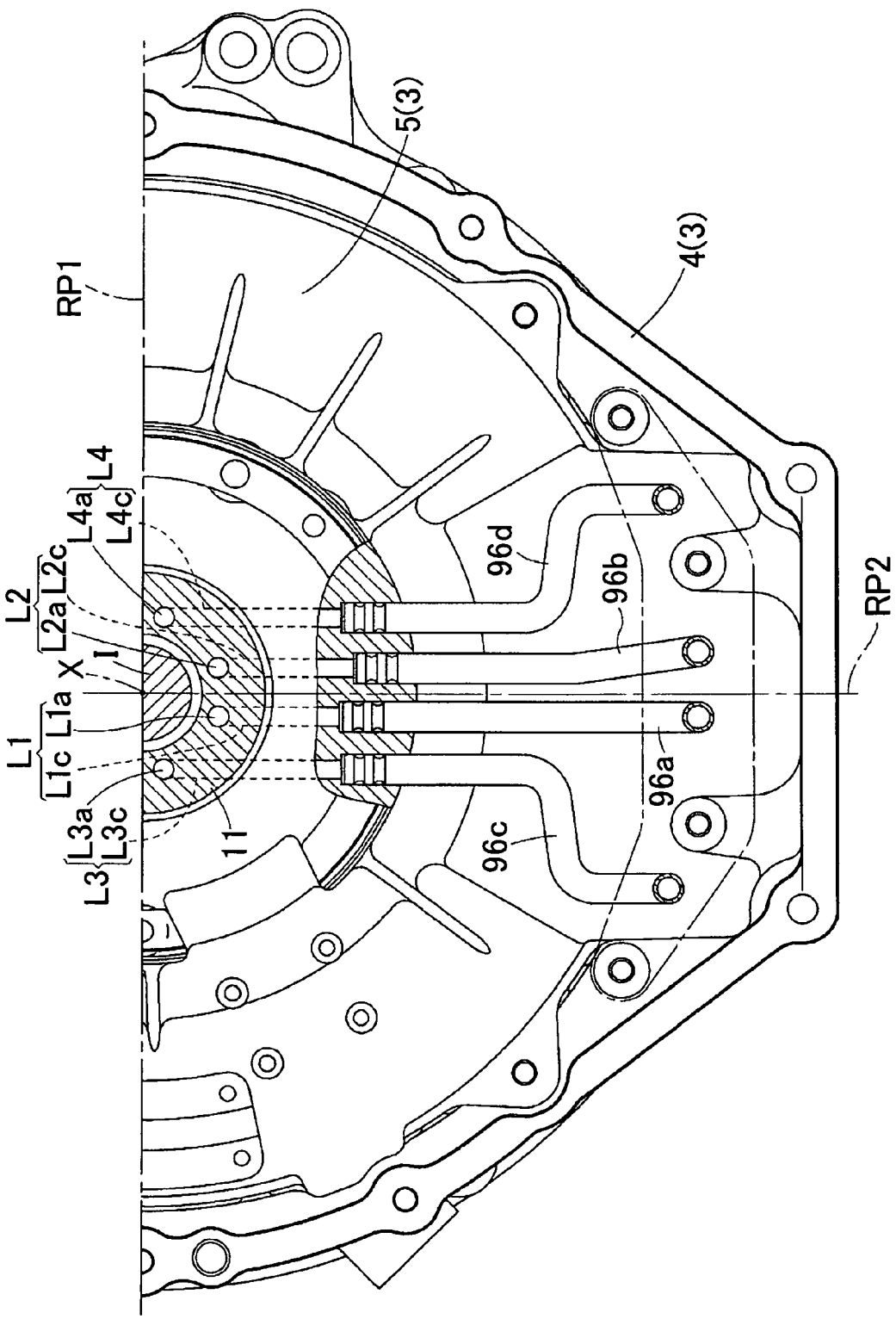
FIG. 5 is a view showing a layout of oil passages in an end portion support wall according to the embodiment of the present invention.

The first oil passage L1 is an oil supply passage communicating with the operating oil pressure chamber H1 of the input clutch C1 for supplying oil to the operating oil pressure chamber H1. In the present embodiment, the first oil passage L1 corresponds to an "operating oil supply passage" in the present invention. The first oil passage L1 is supplied, via a first oil passage forming member 96a (refer to FIG. 5), with the pressurized oil that is discharged by the oil pump 9 and regulated to the predetermined pressure level by the hydraulic pressure control device (not shown). As shown in FIGS. 4 and 5, the first oil passage L1 has a first axial oil passage L1a axially extending in the cylindrical projecting portion 11, a first radial oil passage L1b radially extending in the cylindrical projecting portion 11, and a first in-wall oil passage L1c radially extending in the end portion support wall 5 of the case 3. The first in-wall oil passage L1c is connected, at an end portion located radially outside thereof, to the first oil passage forming member 96a (refer to FIG. 5), and communicates, at an end portion located radially inside thereof, with the first axial oil passage L1a. The first axial oil passage L1a is formed so as to extend linearly from the end portion radially inside of the first in-wall oil passage L1c in the axial second direction A2 along the axial direction. The first radial oil passage L1b is formed so as to communicate with the first axial oil passage L1a, and to extend at least radially outward from the first axial oil passage L1a. In the present example, the first radial oil passage L1b is formed so as to extend linearly along a direction slightly inclined relative to the radial direction.

An end portion on the side in the axial second direction A2 of the first axial oil passage L1a is closed by a closing member (a plug, in the present example) provided in the cylindrical projecting portion 11. The first radial oil passage L1b is open to a first outer circumferential opening portion 12a formed on the outer circumferential face of the cylindrical projecting portion 11. The first outer circumferential opening portion 12a is formed on the outer circumferential face of a minimum diameter portion on the side in the axial second direction A2 relative to the second step portion 11c of the cylindrical projecting portion 11, thus being formed radially inside the sleeve 86 fitted around the end portion on the side in the axial second direction A2 of the cylindrical projecting portion 11. The sleeve 86 is formed with a recessed groove that continues circumferentially while being radially recessed relative to the outer circumferential face, and also formed, at a plurality of circumferential locations, with communication holes communicating between the inner circumferential face and the recessed groove of the sleeve 86. The communication holes and the first outer circumferential opening portion 12a are arranged in positions having portions overlapping with each other when viewed radially.

The cylindrical projecting portion 32e of the cylindrical connecting member 32 is formed with an oil hole 32h communicating the inner circumferential face with the outer circumferential face of the cylindrical projecting portion 32e. The oil hole 32h and the communication holes formed in the sleeve 86 are arranged in positions having portions overlapping with each other when viewed radially. The oil hole 32h communicates with the operating oil pressure chamber H1 via an opening portion located radially outside of the sleeve 86. Consequently, the first radial oil passage L1b communicates with the operating oil pressure chamber H1 via the first outer circumferential opening portion 12a, the communication holes of the sleeve 86, and the oil hole 32h. Accordingly, oil supplied from the first oil passage L1 is appropriately supplied to the operating oil pressure chamber H1 via the first outer circumferential opening portion 12a, the communication holes, and the oil hole 32h.

Note that, in the present embodiment, it is structured such that the oil leaks out little by little in the axial direction through a small space between the outer circumferential face of the sleeve 86 and the inner circumferential face of the cylindrical projecting portion 32e. Then, the oil leaking out through the small space to the side in the axial first direction A1 flows into the bearing arrangement space P, thus lubricating the first bearing 71 arranged in the bearing arrangement space P.

The second oil passage L2 is an oil supply passage communicating with the circulating oil pressure chamber H2 of the input clutch C1 for supplying oil to the circulating oil pressure chamber H2. In the present embodiment, the second oil passage L2 corresponds to a "circulating oil supply passage" in the present invention. The second oil passage L2 is supplied, via a second oil passage forming member 96b (refer to FIG. 5), with the pressurized oil that is discharged by the oil pump 9 and regulated to the predetermined pressure level by the hydraulic pressure control device (not shown). As shown in FIGS. 3 and 5, the second oil passage L2 has a second axial oil passage L2a axially extending in the cylindrical projecting portion 11 and a second in-wall oil passage L2c radially extending in the end portion support wall 5 of the case 3. The second in-wall oil passage L2c is connected at an end portion located radially outside thereof to the second oil passage forming member 96b (refer to FIG. 5), and communicates at an end portion located radially inside thereof with the second axial oil passage L2a. The second axial oil passage L2a is formed so as to extend linearly from the end portion radially inside of the second in-wall oil passage L2c toward the axial second direction A2 along the axial direction.

The second axial oil passage L2a is open to an end face opening portion 12e formed on the end face on the side in the axial second direction A2 of the cylindrical projecting portion 11. The second axial oil passage L2a then communicates with the circulating oil pressure chamber H2 via the end face opening portion 12e. Accordingly, oil supplied from the second oil passage L2 is appropriately supplied to the circulating oil pressure chamber H2 via the end face opening portion 12e. More specifically, in the present embodiment, the second axial oil passage L2a communicates with a first space V1 located on the side in the axial first direction A1 relative to the clutch hub 31 radially extending in the circulating oil pressure chamber H2. Thus, the oil from the second oil passage L2 is supplied to the first space V1 in the circulating oil pressure chamber H2.

By being supplied with the oil via the second oil passage L2, the circulating oil pressure chamber H2 formed as an independent sealed space in the case 3 is basically placed in a state of being filled with oil. Then, the oil flows through inside of the circulating oil pressure chamber H2 while maintaining, as a whole, the state in which the circulating oil pressure chamber H2 is filled with oil. That is, the oil supplied from the second oil passage L2 to the first space V1 of the circulating oil pressure chamber H2 flows radially outward through between the piston 34 and the clutch hub 31 in the axial direction, and reaches the plurality of friction members 33. The oil cools the plurality of friction members 33 through heat exchange therewith. In the present embodiment, the plurality of friction members 33 of the input clutch C1 can be cooled efficiently by the oil filled in the circulating oil pressure chamber H2. The oil after cooling the plurality of friction members 33 flows radially inward through a second space V2 located on the side in the axial first direction A1 relative to the clutch hub 31 in the circulating oil pressure chamber H2, that is, located between the clutch hub 31 and the inner radially extending portion 45 of the cover portion 42 in the axial direction, and reaches a shaft-end hole portion Ib formed in an end portion on the side in the axial second direction A2 of the input shaft I. A space radially inside of the shaft-end hole portion Ib is located in a radially central portion of the second space V2.

A fifth oil passage L5 is formed at an end portion on the side in the axial second direction A2 of the input shaft I. The fifth oil passage L5 is supplied with the oil that has reached the shaft-end hole portion Ib after flowing through the inside of the circulating oil pressure chamber H2. As shown in FIG. 3, the fifth oil passage L5 has a fifth axial oil passage L5a axially extending inside the input shaft I along the center axis X, and a fifth radial oil passage L5b radially extending inside the input shaft I. The fifth axial oil passage L5a is formed so as to be open to a side face on the side in the axial second direction A2 in the shaft-end hole portion Ib of the input shaft I, and to extend linearly from the open portion toward the axial first direction A1 over a predetermined range. In the present example, the fifth axial oil passage L5a is formed so as to extend at least up to a location on the side in the axial first direction A1 relative to a first inner circumferential opening portion 12c (to be described later). The fifth radial oil passage L5b is formed so as to communicate with the fifth axial oil passage L5a, and to extend linearly from the fifth axial oil passage L5a along the radial direction. The fifth radial oil passage L5b is open to the outer circumferential face of the input shaft I between the two third bearings 73 arranged axially side by side with a predetermined space therebetween. Thus, the fifth oil passage L5 communicates the circulating oil pressure chamber H2 with a space between the outer circumferential face of the input shaft I and the inner circumferential face of the cylindrical projecting portion 11. Accordingly, the oil from the radially central portion of the second space V2 of the circulating oil pressure chamber H2 can be guided to the space between the input shaft I and the cylindrical projecting portion 11 via the fifth oil passage L5.

In the present embodiment, out of the two third bearings 73 arranged axially side by side, the third bearing 73b located on the side in the axial second direction A2 communicates side faces on both axial sides thereof with the first space V1 and the second space V2, respectively, either directly or via the fifth oil passage L5. That is, in the third bearing 73b, the side face on the side in the axial second direction A2 directly communicates with the first space V1 in the circulating oil pressure chamber H2, whereas the side face on the side in the axial first direction A1 communicates with the second space V2 in the circulating oil pressure chamber H2 via the fifth oil passage L5. An equal hydraulic pressure can be thus applied to the side faces on both axial sides of the third bearing 73b. Consequently, leakage of the oil need not be taken into account between the third bearing 73b and the cylindrical projecting portion 11, and between the third bearing 73b and the input shaft I, thereby simplifying the structure of the third bearing 73b so as to reduce cost. Note that, in the present example, the third bearings 73 can also be lubricated by using a part of the oil discharged from the circulating oil pressure chamber H2 via the fifth oil passage L5.

The third oil passage L3 is an oil discharge passage communicating with the circulating oil pressure chamber H2 separately from the second oil passage L2 for discharging oil from the circulating oil pressure chamber H2. As shown in FIGS. 3 and 5, the third oil passage L3 has a third axial oil passage L3a axially extending in the cylindrical projecting portion 11, a third radial oil passage L3b radially extending in the cylindrical projecting portion 11, and a third in-wall oil passage L3c radially extending in the end portion support wall 5 of the case 3. The third radial oil passage L3b is open to the first inner circumferential opening portion 12c formed on the inner circumferential face of the cylindrical projecting portion 11, between the two third bearings 73 arranged axially side by side with the predetermined space therebetween. Therefore, the third radial oil passage L3b communicates with the radially central portion of the second space V2 of the circulating oil pressure chamber H2, via the first inner circumferential opening portion 12c, the space between the input shaft I and the cylindrical projecting portion 11, and the fifth oil passage L5 formed inside the input shaft I. Note that, in the present example, the first inner circumferential opening portion 12c and the fifth radial oil passage L5b constituting the fifth oil passage L5 are arranged in positions having portions overlapping with each other when viewed radially.

The third radial oil passage L3b is formed so as to extend at least radially outward from the first inner circumferential opening portion 12c. In the present example, the third radial oil passage L3b is formed so as to extend linearly along a direction inclined relative to the radial direction. The third axial oil passage L3a is formed so as to communicate with an end portion located radially inside of the third radial oil passage L3b, and to extend linearly along the axial direction. An end portion on the side in the axial second direction A2 of the third axial oil passage L3a is closed by a closing member (a plug, in the present example) provided in the cylindrical projecting portion 11. The third in-wall oil passage L3c communicates, at an end portion located radially inside thereof, with an end portion on the side in the axial first direction A1 of the third axial oil passage L3a, and connected, at an end portion located radially outside thereof, to a third oil passage forming member 96c (refer to FIGS. 2 and 5). Accordingly, the oil after cooling the plurality of friction members 33 while flowing through the inside of the circulating oil pressure chamber H2 is discharged via the fifth oil passage L5 and the third oil passage L3, and then returned to the oil pan (not shown) via the third oil passage forming member 96c.

The fourth oil passage L4 is an oil discharge passage for discharging oil from the bearing arrangement space P. As shown in FIGS. 4 and 5, the fourth oil passage L4 has a fourth axial oil passage L4a axially extending in the cylindrical projecting portion 11, a fourth radial oil passage L4b radially extending in the cylindrical projecting portion 11, and a fourth in-wall oil passage L4c radially extending in the end portion support wall 5 of the case 3. The fourth radial oil passage L4*b* is open to a second outer circumferential opening portion 12*b* formed on the outer circumferential face of the cylindrical projecting portion 11. The second outer circumferential opening portion 12*b* is formed so as to face the bearing arrangement space P between the first seal member 81 and the first bearing 71 in the axial direction. In the present example, the second outer circumferential opening portion 12*b* is formed across the large-diameter and the small-diameter portions at the location where the first step portion 11*b* is provided on the outer circumferential face of the cylindrical projecting portion 11.

The fourth radial oil passage L4*b* is formed so as to extend at least radially inward from the second outer circumferential opening portion 12*b*. In the present example, the fourth radial oil passage L4*b* is formed so as to extend linearly along a direction inclined relative to the radial direction. In the present embodiment, the fourth radial oil passage L4*b* is also open to a second inner circumferential opening portion 12*d* formed on the inner circumferential face of the cylindrical projecting portion 11 between the second seal member 82 and the third bearings 73 (the third bearing 73*a* arranged on the side in the axial first direction A1, in the present example) in the axial direction. In this manner, the third bearing 73*a* can also be lubricated by using the oil from the bearing arrangement space P.

The fourth axial oil passage L4*a* is formed so as to communicate with the fourth radial oil passage L4*b*, and to extend linearly along the axial direction. An end portion on the side in the axial second direction A2 of the fourth axial oil passage L4*a* is closed by a closing member (a plug, in the present example) provided in the cylindrical projecting portion 11. The fourth in-wall oil passage L4*c* communicates, at an end portion located radially inside thereof, with an end portion on the side in the axial first direction A1 of the fourth axial oil passage L4*a*, and connected, at an end portion located radially outside thereof, to a fourth oil passage forming member 96*d* (refer to FIG. 5). As described above, a part of the oil supplied via the first oil passage L1 to the operating oil pressure chamber H1 flows into the bearing arrangement space P through the small space between the outer circumferential face of the sleeve 86 and the inner circumferential face of the cylindrical projecting portion 32*e* of the cylindrical connecting member 32, and lubricates the first bearing 71 arranged in the bearing arrangement space P. The oil after lubricating the first bearing 71 in the bearing arrangement space P is discharged via the fourth oil passage L4, and then returned to the oil pan (not shown) via the fourth oil passage forming member 96*d*.

In the present embodiment, as shown in FIG. 5, all of the four oil passages L1 to L4 are formed on one side relative to a predetermined first reference plane RP1 (on the lower side in FIG. 5, in the present example). Furthermore, both the first and the third passages L1 and L3 are formed on one side relative to a predetermined second reference plane RP2 (on the left side in FIG. 5, in the present example) whereas the second and the fourth passages L2 and L4 are formed on the other side relative to the second reference plane RP2 (on the right side in FIG. 5, in the present example). Moreover, the first and the second passages L1 and L2 serving as oil supply passages to the operating oil pressure chamber H1 and the circulating oil pressure chamber H2, respectively, of the input clutch C1 are formed in positions plane-symmetric to each other with respect to the second reference plane RP2. Furthermore, the third and the fourth passages L3 and L4 serving as oil discharge passages from the circulating oil pressure chamber H2 and the bearing arrangement space P, respectively, are also formed in positions plane-symmetric to each other with respect to the second reference plane RP2. Note that, in the present example, the right-left direction in FIG. 5 coincides with the horizontal direction whereas the up-down direction in FIG. 5 coincides with the vertical direction. Further, the horizontal plane passing through the center axis X is referred to as the first reference plane RP1 whereas the vertical plane passing through the center axis X is referred to as the second reference plane RP2.

The third axial oil passage L3*a*, the first axial oil passage L1*a*, the second axial oil passage L2*a*, and the fourth axial oil passage L4*a*, all of which are formed inside the cylindrical projecting portion 11, are arranged circumferentially in that order when viewed axially. All of the in-wall oil passages L1*c* to L4*c* are formed, inside the end portion support wall 5 of the case 3, along the vertical direction so as to be in parallel with the second reference plane RP2. In that formation, the third in-wall oil passage L3*c*, the first in-wall oil passage L1*c*, the second in-wall oil passage L2*c*, and the fourth in-wall oil passage L4*c* are arranged in that order in the direction along the first reference plane RP1 when viewed axially.

The first and the second oil passage forming members 96*a* and 96*b* connected to the first and the second oil passages L1 and L2, respectively, are formed so as to extend linearly in parallel with the second reference plane RP2 when viewed axially. On the other hand, each of the third and the fourth oil passage forming members 96*c* and 96*d* connected to the third and the fourth oil passages L3 and L4, respectively, is formed so as to be bent at two locations, and so that outside portions relative to the respective bending points (a portion on the side of the in-wall oil passage L3*c* or L4*c*, and a portion on the side of the oil pan [not shown]) extend linearly in parallel with the second reference plane RP2 when viewed axially.

4. Other Embodiments

Finally, other embodiments of the drive device for a vehicle according to the present invention will be described. Note that each structure to be disclosed in each embodiment is not only applied to that embodiment, but may also be applied in combination with any structure disclosed in other embodiments, unless any contradiction occurs.

(1) The above embodiment has been described by way of an example in which the rotor support member 22 and the cylindrical connecting member 32 are connected so as to rotate as a unit with each other. However, embodiments of the present invention are not limited to this example. That is, it is also one of preferred embodiments of the present invention to have a structure in which the rotor support member 22 is connected to the cylindrical connecting member 32 via other member. For example, it is possible to employ a structure in which the rotor support member 22 is connected to the cylindrical connecting member 32 via a speed reduction device formed of a planetary gear mechanism and so on.

(2) The above embodiment has been described by way of an example in which the cylindrical connecting member 32 has the cylindrical projecting portion 32*e* in a position that is located on the radially inside of the friction members 33, and at least a part of the operating oil pressure chamber H1 is defined by the cylindrical projecting portion 32*e* and the piston 34 of the input clutch C1 that is slidable relative to the cylindrical projecting portion 32*e*. However, embodiments of the present invention are not limited to this example. That is, it is also one of preferred embodiments of the present invention to have a structure in which, for example, at least a part of the operating oil pressure chamber H1 is defined by the cylindrical projecting portion 11 of the case 3 and the piston 34 that is slidable relative to the cylindrical projecting portion 11.

(3) The above embodiment has been described by way of an example in which the pump drive shaft 47 constituting the power transmission member T is radially supported, on the side in the axial second direction A2, by the pump cover 7 mounted on the intermediate support wall 6. However, embodiments of the present invention are not limited to this example. That is, it is also one of preferred embodiments of the present invention to have a structure in which, in the case where the case 3 is provided with a radially extending wall portion separately from the end portion support wall 5 and the intermediate support wall 6, for example, the power transmission member T is radially supported by the wall portion thus provided.

(4) The above embodiment has been described by way of an example in which the oil pump 9 is coaxially arranged with respect to the intermediate shaft M between the intermediate support wall 6 and the pump cover 7, and the pump drive shaft 47 constituting the power transmission member T is drivingly connected to the pump rotor of the oil pump 9. However, embodiments of the present invention are not limited to this example. That is, it is also one of preferred embodiments of the present invention to have a structure in which the oil pump 9 is arranged in other position in the case 3, for example, the oil pump 9 is arranged with a center axis thereof different from the center axis X. Further, the power transmission member T is drivingly connected to the pump rotor of the oil pump 9 via other members such as shaft members and gear members.

(5) The above embodiment has been described by way of an example in which the first radially fitting portion J1 and the second radially fitting portion J2 are provided in the power transmission member T that is structured in a manner that the first fastening portion F1 and the second fastening portion F2 connect the rotor support member 22, the cylindrical connecting member 32, and the cover portion 42 so as to rotate as a unit with each other. However, embodiments of the present invention are not limited to this example. That is, the first and the second radially fitting portions J1 and J2 are provided in order to radially position the members constituting the power transmission member T in an accurate manner; therefore, one or both of the first and the second radially fitting portions J1 and J2 can be omitted depending on the accuracy of center axis required for the power transmission member T. It is also one of preferred embodiments of the present invention to have a structure in which, for example, the power transmission member T is provided only with the first fastening portion F1, the second fastening portion F2, and the second radially fitting portion J2. In this case, the structure is preferably such that, for example, the third seal member 83 such as an O-ring is arranged between the radially extending portion 24 and the mounting portion 32c constituting the first fastening portion F1 so as to suppress the oil from flowing out to the stator St side of the rotary electric machine MG by sealing the bearing arrangement space P.

(6) The above embodiment has been described by way of an example in which the radially extending portion 24 and the mounting portion 32c are fastened with each other by the first bolts 91, in the first fastening portion F1. The example has also been described in the case in which the radial extension portion 32f and the outer radially extending portion 43 are fastened with each other via the cover-side connecting portions 43a by the second bolts 92, in the second fastening portion F2. However, embodiments of the present invention are not limited to this example. That is, it is also one of preferred embodiments of the present invention to have a structure in which two members to be fastened with each other are joined together by welding in one or both of the first fastening portion F1 and the second fastening portion F2.

(7) The above embodiment has been described by way of an example in which the outer circumferential face of the fitting projecting portion 25a and the inner circumferential face of the cylindrical extending portion 32d radially contact each other and fit against each other so as to constitute the first radially fitting portion J1. However, embodiments of the present invention are not limited to this example. That is, it is also one of preferred embodiments of the present invention to have a structure in which, for example, the radially extending portion 32b of the cylindrical connecting member 32 is provided with an axially projecting portion that projects from the radially extending portion 32b toward the axial first direction A1, and then, the outer circumferential face of the axially projecting portion thus provided and the inner circumferential face of the fitting projecting portion 25a radially contact each other and fit against each other so as to constitute the first radially fitting portion J1.

(8) The above embodiment has been described by way of an example in which the input shaft I is supported on the inner circumferential face of the cylindrical projecting portion 11 via the two third bearings 73 (73a and 73b). However, embodiments of the present invention are not limited to this example. That is, it is also one of preferred embodiments of the present invention to have a structure in which the input shaft I is supported on the inner circumferential face of the cylindrical projecting portion 11 via a single third bearing 73. Alternatively, it is also one of preferred embodiments of the present invention to have a structure in which the input shaft I is supported on the inner circumferential face of the cylindrical projecting portion 11 via three or more of the third bearings 73.

(9) The above embodiment has been described by way of an example in which the cylindrical connecting member 32 has the radially extending portion 32b that extends radially inward from the axially extending portion 32a, and the radially extending portion 32b of the cylindrical connecting member 32 is connected with the rotor support member 22 on the radially inside of the axially extending portion 32a. However, embodiments of the present invention are not limited to this example. That is, it is also one of preferred embodiments of the present invention to have a structure in which, for example, the cylindrical connecting member 32 has a portion extending radially outward from the axially extending portion 32a, and that portion is connected with the rotor support member 22 on the radially outside of the axially extending portion 32a.

(10) The above embodiment has been described by way of an example in which the cylindrical projecting portion 11 of the case 3 is formed with the second oil passage L2 that supplies oil to the circulating oil pressure chamber H2. However, embodiments of the present invention are not limited to this example. That is, it is also one of preferred embodiments of the present invention to have a structure in which, for example, the second oil passage L2 is formed in a different part (such as the intermediate shaft M) of the case 3 than the cylindrical projecting portion 11.

(11) The above embodiment has been described by way of an example in which the intermediate shaft M is formed with the sixth oil passage L6 that supplies oil to the body portion housing chamber H4. However, embodiments of the present invention are not limited to this example. That is, it is also one of preferred embodiments of the present invention to have a structure in which, for example, the sixth oil passage L6 is formed in a part (such as the case 3) different from the intermediate shaft M.

(12) The above embodiment has been described with a case in mind in which the input clutch C1 is structured as a so-called normally open type friction engagement device. However, embodiments of the present invention are not limited to this case. That is, it is also one of preferred embodiments of the present invention to structure the input clutch C1 as a so-called normally closed type friction engagement device.

Figure 6:
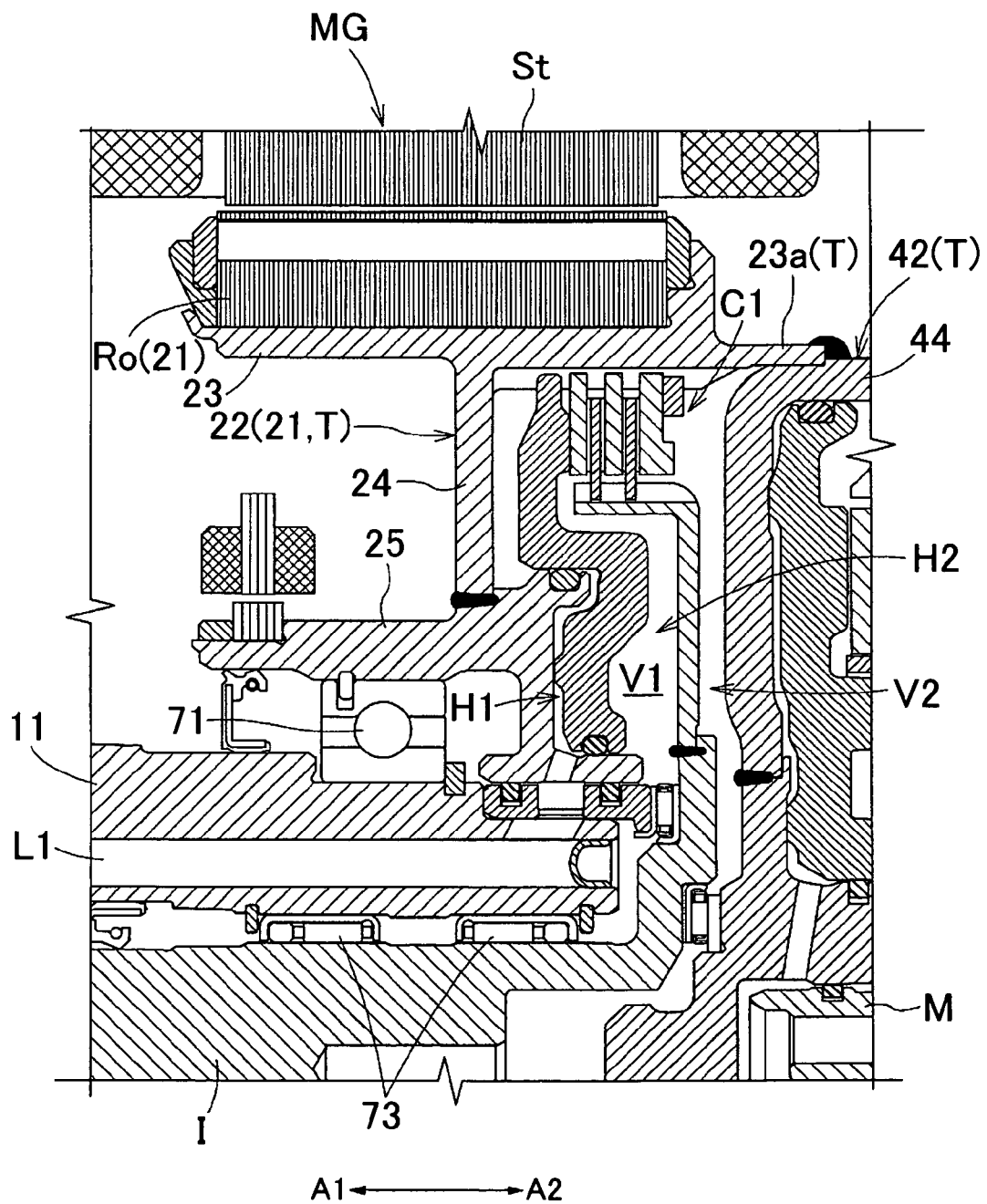
FIG. 6 is an essential part cross-sectional view of a drive device according to another embodiment of the present invention.

(13) The above embodiment has been described by way of an example in which the rotor support member 22 and the cylindrical connecting member 32 are structured as separate members independent of each other. However, embodiments of the present invention are not limited to this example. That is, it is also one of preferred embodiments of the present invention to have a structure in which, for example, the rotor support member 22 and the cylindrical connecting member 32 are provided as a unit with each other. FIG. 6 shows an example of such a structure. In the example shown, the rotor holding portion 23 of the rotor support member 22 is structured to function as a clutch drum of the input clutch C1, while the rotor support member 22 and the cover portion 42 are directly fixed to each other via the rotor holding portion 23. In the present example, an axially projecting portion 23a of a cylindrical shape projects from an end portion on the side in the axial second direction A2 of the rotor holding portion 23 further in the axial second direction A2; then, the inner circumferential face of the axially projecting portion 23a and the outer circumferential face of the axially extending portion 44 are connected to be fixed integrally to each other by being joined together by welding in the state of being mutually fitted while being in contact with each other over the entire circumference.

(14) The above embodiment has been described by way of an example in which the clutch hub 31 is drivingly connected so as to rotate as a unit with the input shaft I, while the cylindrical connecting member 32 constituting the power transmission member T functions as a clutch drum paired with the clutch hub 31. However, embodiments of the present invention are not limited to this example. That is, it is also one of preferred embodiments of the present invention to have a structure in which, for example, a clutch drum is drivingly connected so as to rotate as a unit with the input shaft I, while the cylindrical connecting member 32 is formed so as to have a clutch hub paired with the clutch drum.

(15) The above embodiment has been described by way of an example in which the torque converter TC having the pump impeller 41, the turbine runner 51, and the stator 56 is provided as a fluid coupling in the drive device 1. However, embodiments of the present invention are not limited to this example. That is, it is also one of preferred embodiments of the present invention to have a structure in which, for example, a fluid coupling or the like having only the pump impeller 41 and the turbine runner 51 without having the stator 56 is provided as the fluid coupling in the drive device 1.

(16) The above embodiment has been described by way of an example in which the drive device 1 has a structure suitable for being mounted in an FR (front engine, rear drive) type vehicle, that is, a single-axis structure in which the entire device is coaxially arranged. However, embodiments of the present invention are not limited to this example. That is, it is also one of preferred embodiments of the present invention to structure the drive device to have a double-axis structure in which, for example, a counter gear mechanism or the like is provided, and an axle is arranged having a center axis different from the center axis X shared by the input shaft I and the intermediate shaft M. The drive device having such a structure is suitable for being mounted in an FF (front engine, front drive) type vehicle.

(17) Regarding also other structures, the embodiments disclosed herein are examples in all respects, and embodiments of the present invention are not limited to these examples. That is, as far as including a structure described in the claims of the present application and a structure equivalent thereto, a structure obtained by appropriately modifying a part of the structure that is not described in the claims also falls within the technical range of the present invention as a matter of course.

The present invention can preferably be used for a drive device for a vehicle equipped with an input member drivingly connected to an internal combustion engine, an output member drivingly connected to a wheel, a rotary electric machine, a fluid coupling, an engagement device selectively drivingly connecting the input member with the rotary electric machine and the fluid coupling, and a case housing at least the rotary electric machine, the engagement device, and the fluid coupling.

The invention claimed is:

1. A drive device for a vehicle, comprising:
an input member drivingly connected to an internal combustion engine;
an output member drivingly connected to a wheel;
a rotary electric machine;
a fluid coupling drivingly connected to the rotary electric machine;
an engagement device selectively drivingly connecting the input member with the rotary electric machine and the fluid coupling by hydraulic pressure; and
a case housing at least the rotary electric machine, the engagement device, and the fluid coupling, wherein
the case includes a support wall extending at least radially on a side in an axial first direction that is axially on an internal combustion engine side relative to the engagement device, and a cylindrical projecting portion projecting from the support wall toward a side in an axial second direction that is in a direction opposite to the axial first direction,
the engagement device includes an operating oil pressure chamber supplied with the hydraulic pressure,
a rotor member of the rotary electric machine is radially supported by the cylindrical projecting portion in a rotatable state via a support bearing, and
the cylindrical projecting portion is formed with an operating oil supply passage supplying oil to the operating oil pressure chamber.

2. The drive device for a vehicle according to claim 1, wherein
the engagement device further includes an engagement input side member connected to the input member and an engagement output side member that is paired with the engagement input side member and is connected to the fluid coupling, and
the engagement output side member and the rotor member are connected so as to rotate as a unit with each other.

3. The drive device for a vehicle according to claim 2, wherein
the case includes, separately from a first support wall serving as the support wall, a second support wall extending at least radially on the side in the axial second direction relative to the fluid coupling, the fluid coupling includes a coupling input side member and a coupling output side member paired with the coupling input side member, the engagement output side member and the coupling input side member are connected so as to rotate as a unit with each other, and the coupling input side member is radially supported by the second support wall in a rotatable state via a second support bearing provided separately from a first support bearing serving as the support bearing.

4. The drive device for a vehicle according to claim 3, wherein the rotor member includes a rotor body and a rotor support member extending radially inward from the rotor body so as to support the rotor body, the coupling input side member includes a cover portion housing the body portion of the fluid coupling, and a pump drive shaft that is provided to the radially inside of the second support wall and drivingly connected to an oil pump, the rotor support member, the engagement output side member, and the cover portion are connected so as to rotate as a unit with each other, and the rotor support member is radially supported by the cylindrical projecting portion via the support bearing, and the pump drive shaft is radially supported by the second support wall via the second support bearing.

5. The drive device for a vehicle according to claim 4, wherein the input member is arranged so as to penetrate through the radially inside of the cylindrical projecting portion, and the input member and the engagement input side member are connected so as to rotate as a unit with each other to structure an input transmission member, and a first seal member is arranged between the rotor support member and the cylindrical projecting portion on the side in the axial first direction relative to the engagement device, and a second seal member is arranged between the cylindrical projecting portion and the input transmission member.

6. The drive device for a vehicle according to claim 5, wherein the engagement output side member is formed in a cylindrical shape so as to cover at least the radially outside of the engagement member provided in the engagement device and the engagement output side member includes an opposed cylindrical portion that is arranged so as to be radially opposed to the cylindrical projecting portion on the radially inside of the engagement member, and the support bearing is arranged between the first seal member and the opposed cylindrical portion in the axial direction.

7. The drive device for a vehicle according to claim 5, wherein a junction between the rotor support member and the engagement output side member is formed with a fastening portion where both of the members are fastened with each other by a bolt, and a radially fitting portion where both of the members radially contact each other and fit against each other, and a third seal member is further arranged between the rotor support member and the engagement output side member at the radially fitting portion.

8. The drive device for a vehicle according to claim 4, wherein the engagement device further includes an engagement member and a pressing member pressing the engagement member, the engagement output side member includes an axially extending portion axially extending so as to cover at least the radially outside of the engagement member, and a radially extending portion that is provided as a unit with the axially extending portion and extends radially inward from an end portion on the side in the axial first direction of the axially extending portion, the operating oil pressure chamber is formed between the radially extending portion and the pressing member, and the rotor support member is connected to the radially extending portion, and an open end portion on the side in the axial second direction of the axially extending portion is connected to the cover portion.

9. The drive device for a vehicle according to claim 2, further comprising:

an intermediate output member drivingly connected to the fluid coupling and also drivingly connected to the output member, wherein the fluid coupling includes a body portion housing chamber housing a body portion of the fluid coupling, and the intermediate output member is formed with a coupling supply oil passage supplying oil to the body portion housing chamber.

10. The drive device for a vehicle according to claim 2, wherein the engagement device further includes an engagement member and a pressing member pressing the engagement member, the engagement output side member is formed in a cylindrical shape so as to cover at least the radially outside of the engagement member and the engagement output side member includes an opposed cylindrical portion that is arranged so as to be radially opposed to the cylindrical projecting portion on the radially inside of the engagement member, at least a part of the operating oil pressure chamber is defined by the pressing member slidably arranged relative to the opposed cylindrical portion and by the opposed cylindrical portion, and the opposed cylindrical portion is formed with an oil hole communicating between the operating oil supply passage and the operating oil pressure chamber.

11. The drive device for a vehicle according to claim 10, wherein the opposed cylindrical portion is arranged on the radially outside of the cylindrical projecting portion, and the support bearing is radially supported on an outer circumferential face of the cylindrical projecting portion and is arranged between the support wall and the opposed cylindrical portion in the axial direction.

12. The drive device for a vehicle according to claim 2, wherein the input member is arranged so as to penetrate through the radially inside of the cylindrical projecting portion and is radially supported on an inner circumferential face of the cylindrical projecting portion in a rotatable state via a third support bearing provided separately from a first support bearing serving as the support bearing.

13. The drive device for a vehicle according to claim 1, wherein the cylindrical projecting portion is formed with a circulating oil supply passage that supplies oil to an engagement member housing chamber housing the engagement member provided in the engagement device.

* * * * *